United States Patent [19]

Baumann et al.

[11] 3,970,898

[45] July 20, 1976

[54] METHOD OF AUTOMATICALLY ISOLATING A FAULTY SECTION OF A POWER LINE BELONGING TO AN ELECTRICAL ENERGY SUPPLY NETWORK, AND ARRANGEMENT FOR CARRYING OUT THIS METHOD

[75] Inventors: Eduard Baumann, Uster; Candidus A. Waldispuhl, Zurich, both of Switzerland

[73] Assignee: Zellweger Uster AG, Uster, Switzerland

[22] Filed: Nov. 4, 1974

[21] Appl. No.: 520,733

[30] Foreign Application Priority Data

Nov. 23, 1973 Switzerland.................. 16520/73

[52] U.S. Cl................................ 317/25; 317/22; 317/29 R
[51] Int. Cl.²...................................... H02H 7/26
[58] Field of Search .................. 317/25, 22, 23, 26, 317/29 R, 27 R, 28 R

[56] References Cited
UNITED STATES PATENTS

| | | | |
|---|---|---|---|
| 2,128,816 | 8/1938 | Hamilton, Jr. et al. | 317/25 |
| 2,292,860 | 8/1942 | Anderson | 317/25 X |
| 2,594,371 | 4/1952 | Ward | 317/28 R |
| 2,735,962 | 2/1956 | Ellis et al. | 317/29 R |
| 2,942,154 | 6/1960 | Van Ryan | 317/29 R X |
| 3,223,917 | 12/1965 | Schweitzer | 317/29 R X |
| 3,388,297 | 6/1968 | Curtis et al. | 317/29 R X |

*Primary Examiner*—J D Miller
*Assistant Examiner*—Patrick R. Salce
*Attorney, Agent, or Firm*—Werner W. Kleeman

[57] ABSTRACT

A method of and apparatus for automatically isolating a faulty section of a power line, of an electrical supply network, the power line being adapted to be connected to at least one energy source and to be temporarily divided up into sections by switches following the appearance of an excess current, and automatically reconnecting normally operating sections of the power line to at least one energy source, wherein a signal is transmitted from the place of at least one switch, which has opened automatically after an excess current that has passed through it, through a non-faulty part of the power line to at least one other switch, through which at least a part of the excess current had passed to the now opened switch, and which has automatically opened as well, reception of the aforementioned signal being an essential requirement for closing the said other switch.

17 Claims, 18 Drawing Figures

METHOD OF AUTOMATICALLY ISOLATING A FAULTY SECTION OF A POWER LINE BELONGING TO AN ELECTRICAL ENERGY SUPPLY NETWORK, AND ARRANGEMENT FOR CARRYING OUT THIS METHOD

BACKGROUND OF THE INVENTION

The present invention relates to a method of automatically isolating a faulty section of a power line belonging to an electrical energy supply network and also pertains to an arrangement for carrying out the aforesaid method.

It is known that power lines of high-voltage energy supply networks can be provided with automatic safety devices. Safety devices of this kind are used in particular for rapidly isolating faulty power line sections and for reconnecting them quickly after the fault has been eliminated. Safety devices of this kind prevent high-voltage energy supply networks from becoming damaged in the event of short circuits. Additionally they have the advantage of avoiding unnecessarily long breaks in operation in the event of temporary short circuits of the kind frequently encountered in practice. Safety devices of this kind are expensive, with the result that, as a rule, they only can be used economically in power lines serving large energy-supply areas. Accordingly, they are generally used only in high-voltage power supply systems of from about 50 kV upwards.

In contrast to such high-voltages power supply systems the isolation of faulty sections of a power line in so-called medium-voltage power supply systems of the kind operated, for example, at voltages of around 5 kV to 50 kV for supplying electricity to individual urban areas, is still generally carried out by hand at the section where the fault has occurred. The result of this is that, in the event of a fault, the isolation of the faulty section required for eliminating the fault takes a considerable amount of time, partly because the fault first of all has to be located and partly because, in towns, urban traffic conditions often make it difficult to reach the faulty section of the power line quickly once the fault has been located, while in country or rural areas access to the power lines is often difficult. As a result, numerous consumers served by the same power line are inconvenienced unnecessarily by the fault for a long period before it is corrected.

In order to avoid these difficulties, it is possible for example to provide a power line with circuit breakers for dividing it up into individual sections, these circuit breakers being provided with an automatic cutout. By suitably staggering the response time of the individual circuit breakers, it is possible, in a certain mains configuration, for only the faulty section to be automatically switched-off in the event of a fault.

Unfortunately, the automatic circuit breakers required are quite expensive and the staggering of the response times is governed by the mains configuration, with the result that, in the event of a change in the mains configuration, this system has to be adapted to the new conditions, i.e., the stagger may have to be changed.

Although arrangements are known which employ mostly isolators and only a few circuit breakers, for dividing up the power line into individual sections, these arrangements necessitate the use of signal-transmission systems and transmission channels that are independent from the aforementioned power line for eliminating a faulty section from the power line.

Arrangements have been developed for special cases, in which the power line only can be divided up into sections by circuit breakers, the individual circuit breakers being associated with transmission systems linked with one another through transmission channels independent of the power line.

In all solutions where isolators or on-load switches are provided for dividing up the power line, final elimination of the faulty section involves temporary isolation of the power line from its associated energy source, because switches of the kind referred to above are known to be unsuitable for isolating excess currents.

It would be desirable for economic reasons to use only inexpensive isolators for dividing up the power line into individual sections, and to use the considerably more expensive circuit breakers solely for connecting and disconnecting the power line as a whole to and from one or more energy sources. However, brief interruption of the flow of current to all the consumers connected to one and the same power line is in this case inevitable. This is economically preferable to having to keep all the consumers connected to the faulty power line waiting until the fault has been eliminated.

Other known arrangements are based on the so-called successive closing test, in which, in the event of a fault in a section of a power line, the power line affected by the fault is first divided up into its individual sections, after which the individual sections are successively placed under voltage again starting from the source. It is only in the event of a switching on to a section which is still faulty that the power line is divided up again and the normally operating sections reconnected. Although these solutions are suitable for all standard mains configurations, they are confined to energy supply networks whose section switches are capable of switching on to a faulty section. Accordingly, it is necessary in this case to provide either circuit breakers or specially dimensioned on-load switches for separation into the individual sections. In other words, the inexpensive isolators cannot be used in this case, with the result that this arrangement is excessively expensive.

Arrangements which use signal transmission channels, for example in the form of control lines laid between the individual switches of the power line, have the disadvantages that such transmission channels are expensive and, because they are normally positioned near the power line, they are likely to be affected by faults in the power line, for example short circuits. This applies in particular as regards communications channels situated adjacent the power line in question. In this connection, reference is made to the publication "IEE Conference Publication No. 99 Part I: Contributions der Konferenz CIRED, London 1973", page 187, Section 3.2.2, to the use of the power line itself for signal transmission. However, it must be pointed out that, in the event of a fault, a signal has to be transmitted over a faulty section, which naturally jeopardises reliable signal transmission.

SUMMARY OF THE INVENTION

Accordingly, an object of the present invention is to provide a method of isolating a faulty section of a power line belonging to an electrical energy supply network, and an apparatus for carrying out this method, in which circuit breakers are only used for connecting the power line to one or more energy sources, whereas ordinary switches, such as isolators or, optionally, onload switches, are used for dividing up the power line into individual sections, parts of the power line, as opposed to separate lines, being used as signal transmission channels for reasons of economy. In addition, the method according to the invention and the apparatus by which it is carried out are intended to be such that any change in the mains configuration, such as may have to be made in the event of further extension of the energy supply network, does not have any influence upon the apparatus, in other words subsequent changes in the mains configuration do not involve any changes in or adaptation to any parts of the already existing installation.

Accordingly, the invention provides a method of automatically isolating a faulty section of a power line, of an electrical supply network, the power line being adapted to be connected to at least one energy source and to be temporarily divided up into sections by switches following the appearance of an excess current, and of automatically reconnecting normally operating sections of the power line to at least one energy source, wherein a signal is transmitted from the place of at least one switch, which has opened automatically after an excess current that has passed through it, through a non-faulty part of the power line to at least one other switch, through which at least a part of the excess current had passed to the now opened switch, and which has automatically opened as well, reception of the aforementioned signal being an essential requirement for closing the said other switch.

The invention also provides an arrangement for carrying out the method of the invention in which a power line of an electrical energy supply network is adapted to be connected to at least one energy source by means of a first switch and divided into individual sections by further switches and a switch-operating means is associated with each of the aforementioned switches, each of said switch-operating means being controllable at the particular switch by a monitoring means associated with it and its associated switch, in dependence on the current in the power line, wherein a transmitter controllable in dependence upon the response of the monitoring means is associated with each one of at least a certain number of the switches, and a receiver is associated with each one of at least a certain number of the switches, the receiver being connected through a control connection to the switch-operating means associated with its associated switch, the output of each transmitter associated with a certain switch being connected or adapted for connection through a transmission channel containing a non-faulty part of the power line to the input of a receiver associated with another switch adjacent to that switch in the power line, and the signal transmission in the aforementioned transmission channel being directed opposite to the direction of energy flow in the power ling throughout the duration of an excess current in order to control the switch associated with the receiver in dependence upon a signal transmitted in the event of an excess current.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
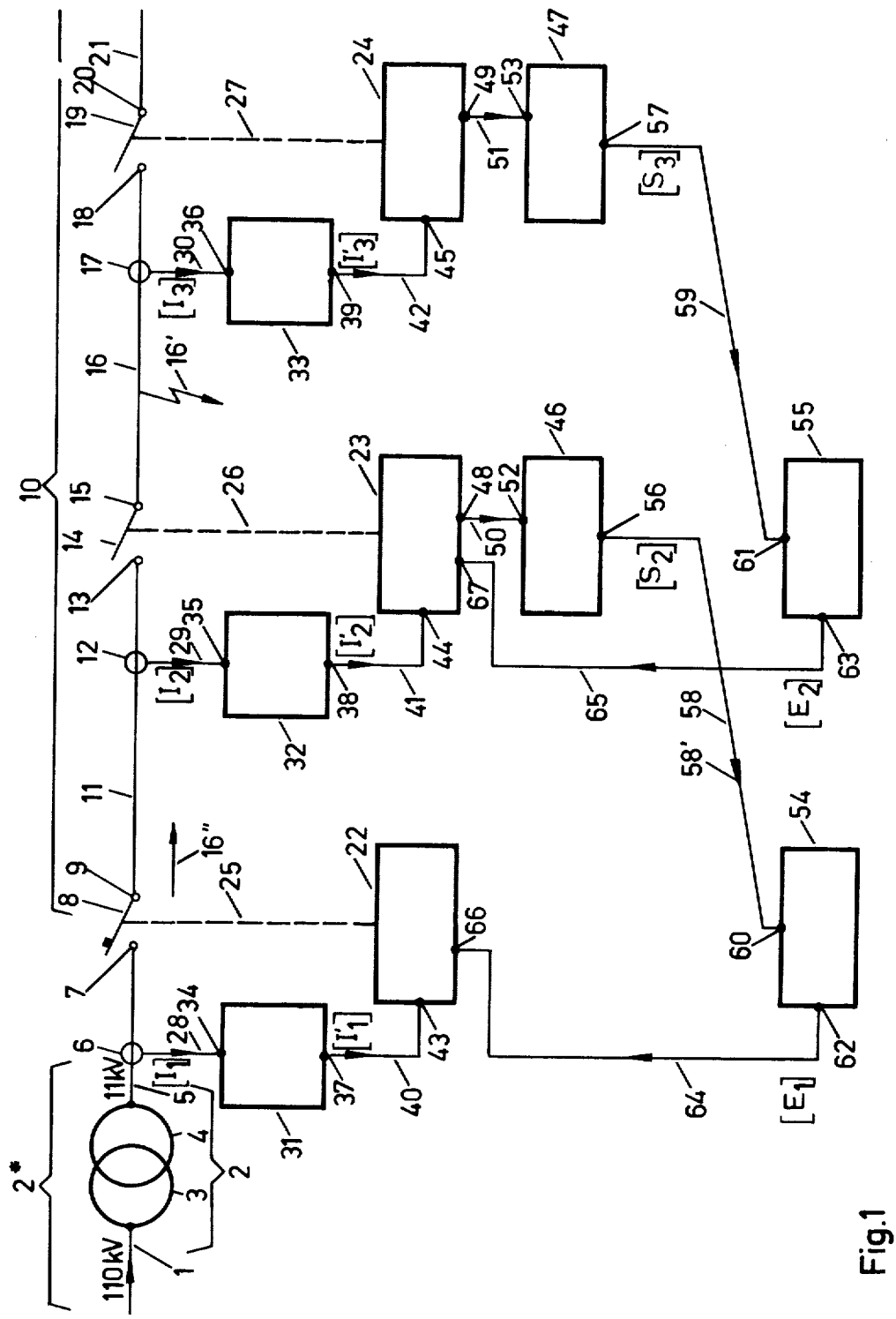
FIG. 1 is a simplified block circuit diagram of a first embodiment of the invention in which energy is fed in on one side.

In all the Figures, identical components have been provided with the same reference characters.

In FIG. 1 (drawn in single phase), the reference character 1 denotes a busbar, for example carrying 110 kV, of a transformer station of a medium-voltage energy-supply network. The high voltage of 110 kV is fed to the primary side 3 of a transformer 2 by means of which it is stepped down to 11 kV, the stepped-down voltage being delivered from the secondary side 4 of the transformer 2 to a medium-voltage busbar 5.

The 11 kV voltage is delivered through a current transformer 6 to one terminal 7 of a first switch 8. A power line 10 is connected to the other terminal 9 of the first switch 8, a first section of the power line being denoted by the reference character 11. The section 11 leads through a second current transformer 12 to one terminal 13 of a second switch 14 whose other terminal 15 is connected to one end of a second section 16. The section 16 has a third current transformer 17 and is connected at its other end to a first terminal 18 of a third switch 19. A third section 21 of the power line 10 is connected to the other terminal 20 of the third switch 19.

Hence, the power line 10 can be connected by closing the first switch 8 to an energy source 2* represented in the present case by the high-voltage busbar 1, the transformer 2 and the medium-voltage busbar 5. The power line 10 can be divided up into three sections 11, 16 and 21 by opening the second switch 14 and the third switch 19.

First, second and third switch-operating means 22, 23 and 24 are associated with the first, second and third switches 8, 14 and 19 respectively, which can be automatically opened and closed by these switch-operating means. Embodiments of the switch-operating means 22, 23 and 24 are described below with reference to FIGS. 4, 5, 10 and 11. At this stage, it is sufficient to observe that they are connected through coupling elements 25, 26 and 27 to their associated switches 8, 14 and 19. In FIG. 1, these coupling elements are each represented by a chain or broken line. The coupling elements used can be, for exemple, mechanical, electromechanical or pneumatic.

Electrical connections 28, 29 and 30 lead from the first, second and third current transformers 6, 12 and 17 to first, second and third monitoring means 31, 32 and 33. The current intensity I present in the power line 10 at the respective switches 8, 14 and 19 is the operating parameter of the power line 10 which is monitored by these monitoring means. Accordingly, signals $I_1$, $I_2$ and $I_3$ are present at the inputs 34, 35 and 36 of the first, second and third monitoring means 31, 32 and 33, respectively, expressing the current intensity at the corresponding point along the power line.

The monitoring means 31, 32 and 33 are designed in such a way that they emit signal $I_1'$, $I_2'$ and $I_3'$ at their outputs 37, 38 and 39 whenever the current I in the power line 10 exceeds a predetermined value at the first, second or third switch 8, 14 or 19, or when a short-circuit current occurs as a result of a short circuit at any point along the power line 10.

Similarly, a monitoring means can also be designed in such a way that it responds to the appearance of a fault current such as, for example, an earth leakage current.

This signal $I_1'$, $I_2'$ or $I_3'$ is delivered through a control line 40, 41 or 42 from the output 37, 38 or 39 of the first, second or third monitoring means 31, 32 or 33 to a first control input 43, 44 or 45 of the first, second or third switch-operating means 22, 23 or 24.

Transmitters 46 and 47 respectively are associated, in this instance, with the second switch 14 or with its associated switch-operating means 23 or with the third switch 19 or with its associated switch-operating means 24. Control lines 50 and 51 lead from the outputs 48 and 49 of the second and third switch-operating means 23 and 24 to inputs 52 and 53 of the transmitters 46 and 47.

A first receiver 54 is associated with the first switch 8, or with its switch-operating means 22 and advantageously also a second receiver 55 is associated in this instance with the second switch 14 or with its switch-operating means 23.

The transmitters 46 and 47 are adapted to emit signals $S_2$ and $S_3$ at their outputs 56 and 57, at least for a predetermined period, when an excess current is detected by the associated monitoring means 32 or 33 or when, as a result, the associated switch 14 or 19 moves into or remains in the open position.

In the present embodiment and also in the other embodiments described hereinafter, the monitoring means for current in the power line controls the transmitter to cause it to emit a signal in the event of excess current only indirectly through the associated switch-operating means or in dependence upon the position of the switch which it operates. However, the transmitter could alternatively be directly controlled by the associated monitoring means itself or by its output signal $I_2'$ or $I_3'$. However, the indirect control referred to has the additional advantage that it ensures that a signal is transmitted by the receiver only after the switch-operating means has actually responded or only after the corresponding switch has been actually opened.

The output 56 of the transmitter 46 of the second switch 14 and the output 57 of the transmitter 47 of the third switch 19 are connected through transmission channels 58 and 59 respectively, to the inputs 60 and 61 of the receivers 54 and 55 associated with the first and second switch 8 and 14.

In contrast to known arrangements in which the signal formed by a transmitter in the event of or following the appearance of an excess current is transmitted to a receiver through the faulty section of the power line, the arrangement according to the present invention is such that a fault-free section leading to the corresponding receiver is always available as a transmission channel for transmitting the aforementioned signal, thereby eliminating the obvious danger inherent in known solutions of transmitting a signal through a section of the power line affected by a fault, for example a short circuit.

For the transmission of the signal from a transmitter to a receiver which, in a specific event of a fault, is located in a direction opposite to the direction of energy flow in the power line existing during occurrence of the excess current, a fault-free section of the power line situated between the transmitter and the receiver is being used. The signal is preferably transmitted by a mains superposition technique, i.e., signals of preferably audio frequency are transmitted through the power line with capacitive or inductive coupling-in and coupling-out of the signal. The signal $S_2$ or $S_3$ is then evaluated in the receiver 54 or 55 in a manner to be explained below. The result of this evaluation is delivered in the form of a signal $E_1$ or $E_2$ from the output 62 or 63 of the receiver 54 or 55 through a control connection 64 or 65 to another input 66 or 67 of the first or second switch-operating means 22 or 23.

Since, in the event of an excess current, a signal has to be transmitted from at least one switch, which is now open, to the switch (or its receiver) adjacent to it in the power line opposite to the energy direction throughout the duration of the excess current, it is essential to know this energy direction. In simple embodiments of the invention, i.e., in cases where energy is fed into the power line on one side, there being only one energy source 2* as is the case in the embodiment illustrated in FIG. 1, this energy direction is determined by the structure of the particular energy-supply network. Accordingly, the direction in which the signal $S_2$ or $S_3$ must be transmitted is determined by the structure of the corresponding energy-supply network, with the result that the transmission channels 58 and 59 need only be established once.

This is not the case where energy is fed in on two sides or in intermeshed networks, as will be shown hereinafter. In these cases, the energy direction has to be determined from case to case in the event of an excess current. The corresponding transmission channels from the transmitters associated with the switches to the adjacent receivers then have to be selected or switched over, in dependence upon the particular energy direction detected.

Means are known for determining the aforementioned energy direction and are known as directional relays. Directional relays suitable for the purpose in question are, for example, obtainable from Siemens AG under the commercial designation R3W7a. A description of this directional relay can be found in the Siemens AG publication "Schutztechnik, Schutzeinrichtungen und Relais", BK10 S 474 - R/172, pages 4/18 to 4/20. A directional relay of this kind can also be used for determining energy direction in the event of a fault current, for example an earth leakage current.

Before details of the apparatus illustrated in block form in FIG. 1 and their mode of operation, are discussed, a second embodiment will first of all be described with reference to FIG. 2. In this second embodiment, the power line is adapted to be connected to an energy source at both ends. The means associated with each of the switches arranged in the power line have only been shown in simplified form in order to make clearer the correlations in the effects of those parts of the apparatus present between the individual points of the power line.

Figure 2:
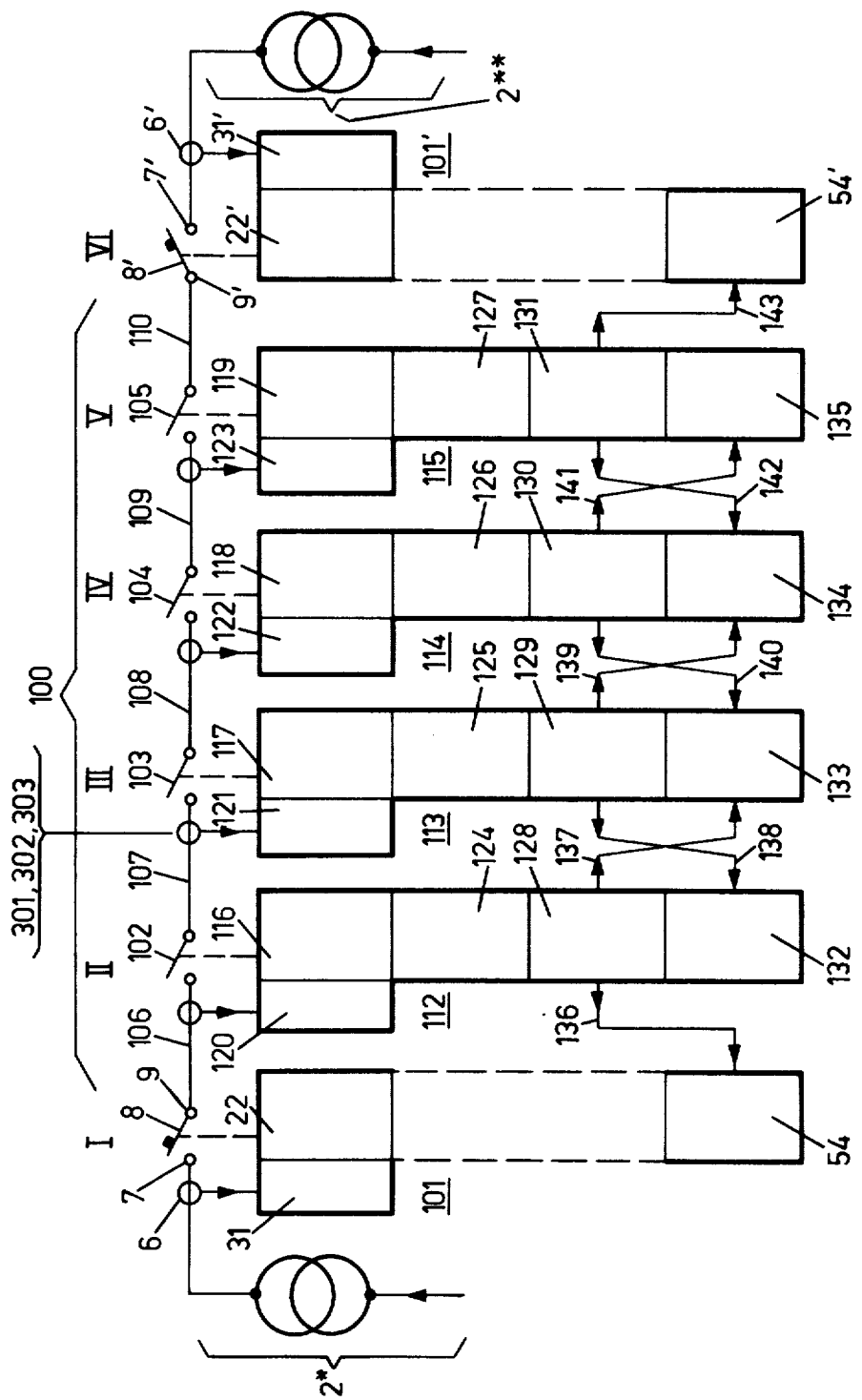
FIG. 2 is a block circuit diagram of a second embodiment in which energy is fed in on two sides.

According to FIG. 2, the first energy source 2* is connected through the current transformer 6 to one terminal 7 of the first switch 8, whose other terminal 9 is connected to one end of a power line 100. The switch-operating means 22 and the monitoring means 31 are associated with the first switch 8 in the same way as in the first embodiment illustrated in FIG. 1. In addition, a receiver 54 is associated with this switch 8 arranged at the point 1 of the power line 100, or with its switch-operating means 22, in the same way as in FIG. 1.

A second energy source 2** is connected through a current transformer 6' to one terminal 7' of a switch 8'. The other end of the power line 100 is connected to the other terminal 9' of the switch 8'.

A switch-operating means 22' and a monitoring means 31' is associated with the other switch 8' in the same way as for the first switch 8. A receiver 54' is associated with the switch 8' arranged at a point VI of the power line 100 or with its switch-operating means 22', in this instance in the same way as for the switch 8 arranged at the point 1 of the power line.

The power line 100 can be divided up into sections 106, 107, 108, 109 and 110 by switches 102, 103, 104 and 105 arranged at points II, III, IV and V.

The auxiliary means associated with the switches 8 and 8', i.e., their switch-operating means 22 and 22', their monitoring means 31 and 31' and their receivers 54 and 54', are shown simplified as control means 101 and 101' in FIG. 2.

Control means 112, 113, 114 and 115 are also associated with the switches 102, 103, 104 and 105. The control means 101 and 101' can be regarded as simplified embodiments of the control means 112 to 115, because some of the components present in the control means 112 to 115 are not necessary in their case and for this reason are omitted.

In addition to their switch-operating means 116, 117, 118 and 119, each of the control means 112 to 115 contains monitoring means 120, 121, 122 and 123 and, for determining energy direction in the event of an excess current, directional relays 124, 125, 126 and 127 respectively.

Each of the control means 112 to 115 further comprises a transmitter 128, 129, 130, 131 and a receiver 132, 133, 134, 135.

Both the switch 8 in the first embodiment illustrated in FIG. 1 and also the switches 8 and 8' in the second embodiment illustrated in FIG. 2 can be in the form of quick-reclose circuit breakers, preferably when the power line 10 or 100 is in the form of an overhead line. Switches of this kind (8 and 8') automatically open very quickly in the event of an excess current or in the event of a short-circuit current in the power line 10 or 100, and reclose automatically shortly afterwards. It is only in cases where the power line connected to them continues to take up an excess current or short-circuit current from the energy source that they open and are reclosed in the manner described hereinafter.

Accordingly, these circuit breakers 8 and 8' are designed to be able repeatedly to switch off short-circuit currents and also to switch into a power line affected by a short circuit without suffering any damage. Switches suitable for this purpose are known, for example the oil-blast switches manufactured by Messrs. Sprecher and Schuh AG, Aarau, Switzerland, Type HP 304e, cf. publication "Oelstrahlschalter fur Innenanlagen 6 . . . 36 kV", 410 1 . . . 5 (January 1971).

Since circuit breakers are expensive, they are only used at the beginning of the power line 10 and at the beginning and end of the power line 100, whereas considerably less expensive switches, namely on-load switches or even just isolators, are used for the other switches, i.e., for the switches 14, 19 and 102 to 105. An on-load switch is a type of switch which, although being able to switch a certain load on and off without being damaged itself, is not designed to switch off a short-circuit current. By contrast, an isolator is a type of switch which, effectively, can only be switched from one position to the other when there is substantially no current flowing, for example when a circuit breaker preceding it is already open. Switches suitable for this purpose are known, for example, the type THGL 104, 106, 107 and type THG 204 and 206 switches manufactured by Messrs. Sprecher und Schuh, Aarau, Switzerland.

In order to be able to use the less expensive switches referred to, the control means associated with the switches belonging to the individual sections in the embodiments illustrated in FIGS. 1 and 2 are made to be such or the transmission channels between the transmitters and receivers present in them are made or switched over in such a way, that those switches 14, 19 and 102, 103, 104, 105 which are not situated at an end of the power line are only ever operated when at least substantially free from voltage or current.

In the first embodiment illustrated in FIG. 1, it is assumed that the circuit breaker 8 does not have an automatic reclose facility, that all the switches 8, 14 and 19 are initially closed, and that a short-circuit subsequently occurs at a certain point in the section 16. This short-circuit is symbolised by an arrow 16' in FIG. 1. The excess current which then flows from the energy source 2* towards the short circuit 16 flows through the switches 8 and 14 and is detected both by the monitoring means 31 of the first switch 8 and by the monitoring means 32 of the second switch 14. In contrast, no short-circuit current is detected by the monitoring means 33 associated with the third switch 19.

The short-circuit current causes the switch 8 in the form of a circuit breaker to cut-out automatically. As a result of detecting the excess current (or short-circuit current) then the monitoring means 32 of the switch 14 emits the signal $I_2'$ at its output 38. This signal is delivered to the input 44 of the switch-operating means 23. The signal $I_2'$ at the input 44 of the switch-operating means 23 causes the switch-operating means 23 to open the switch 14, although precautions are taken to ensure that the switch 14 is in fact only ever opened after the preceding circuit breaker 8 has drained the power line of current or voltage. The nature of these precautions are explained below. Since, as already mentioned, the monitoring means 33 has not detected an excess current (on account of feed-in from the left), the switch-operating means 24 associated with it has not opened the switch 19 associated with it.

As is explained below, the switch-operating means 23 is designed in such a way that it can only close the switch 14 when a signal $E_2$ coming from the output 63 of the receiver 55 arrives at its input 67 through the control connection 65. However, this signal $E_2$ only can be formed by the receiver 55 when a signal $S_3$ arrives at its input 61 through the transmission channel 59 from the output 57 of the transmitter 47 of the switch-operating means 24 associated with the switch 19. The arrangement is such that a signal $S_3$ is only emitted for a certain period after opening of the switch 19. However, since as already mentioned the switch 19 is not opened due to the absence of an excess current in its vicinity, the transmitter 47 is unable to release a signal $S_3$. Accordingly, no signal $E_2$ is formed at the output 63 of the receiver 55, with the result that no command to close is transmitted through the control connection 65 to the switch-operating means 23 of the switch 14. Accordingly, the switch 14 remains open.

With the switch 14 as well, the arrangement is such that the transmitter 46 associated with the switch-operating means 23 or with the switch 14 can only emit a signal $S_2$ at its output 56 when the switch 14 is or has been opened. In the case illustrated, this does in fact apply to the switch 14, so that the signal $S_2$ is delivered through the transmission channel 58 to the input 60 of the receiver 54 associated with the switch-operating means 22 or with the switch 8. As a result, the receiver 54 emits a signal $E_1$ at its output 62, this signal being delivered through the control connection 64 to the other input 66 of the switch-operating means 22 which, through its coupling element 25, causes the switch 8 to close after a certain delay. As a result of this, however, part of the power line 10, i.e., the section up to the open switch 14, is again placed under voltage, although the section 16 affected by the short circuit 16' is now isolated from the power line.

In this connection, it will be recalled that, according to the invention, the signal $S_2$ is transmitted through the transmission channel 58 opposite to the energy direction prevailing while the excess current lasts, i.e., opposite to the direction of the arrow 16" indicating this energy direction. In the first embodiment illustrated in FIG. 1, in which energy is fed into the power line 10 on one side only, the energy direction indicated by the arrow 16" is the only possible energy direction in the event of a fault. Accordingly, the signal $S_2$, if it occurs at all, can only ever follow the opposite direction indicated by the arrow 58'. In this case, therefore, there need only be one transmission channel 58 permanently established between the output 56 of the transmitter 46 and the input 60 of the receiver 54, which is in contrast to cases where energy is fed in on two sides, as will be explained below.

If the short-circuit were to occur in the section 21 rather than in the section 16, not only the switch 14 but also the switch 19 would open in the manner described above. For this reason, the transmitter 47 associated with the switch-operating means 24 or with the switch 19 would, as a result, emit at its output 57 a signal $S_3$ which would be delivered through the transmission channel 59 which, in this simple embodiment, is also permanently connected to the input 61 of the receiver 55. The receiver 55 would then emit at its output 63 a signal $E_2$ which would be delivered through the control connection 65 to the input 67 of the switch-operating means 23. In the same way, the transmitter 46 associated with the switch-operating means 23 or with the switch 14 would, as a result of the switch 14 still being open, emit at its output 56 a signal $S_2$ which would be delivered through the transmission channel 58 to the input 60 of the receiver 54. The receiver 54 would then emit at its output 62 the signal $E_1$ which would be delivered through the control connection 64 to the other input 66 of the switch-operating means 22 associated with the switch 8. Accordingly, the switch 14 would close under the effect of the signal $E_2$, and the switch 8 would close under the effect of the signal $E_1$. In this way, the power line 10 would be reconnected to the energy source 2* up to the terminal 18 of the switch 19. The section 21 affected by a short circuit in this case would thus be isolated from the power line 10 due to the switch 19 being open.

If the energy-supply network is based on overhead lines, it can be of advantage to equip the first switch 8 with an automatic reclose device. In this way, the temporary short circuits which frequently occur in overhead lines are eliminated by the automatic brief opening of the switch 8. By suitable designing the monitoring and switch-operating means, it is possible to prevent the switches 14 and 19 from being unnecessarily opened in the event of brief short circuits.

In contrast to the first embodiment described with reference to FIG. 1, energy is fed into the power line on two sides in the second embodiment illustrated in FIG. 2 which comprises two energy sources 2* and 2** Circuit breakers 8 and 8' with associated control means 101 and 101' are provided at each end of the power line 100, the sections 106, 107, 108, 109 and 110, and the switches 102, 103, 104 and 105 lying between them. Control means 112, 113, 114 and 115, are associated with each of the switches 102 to 105.

Suppose, for example, that a short circuit has occurred in the section 108. It will readily be seen that, in the event of an excess current, the energy direction in the sections 106 and 107 to the left of the section 108 is from left to right, but from right to left in the sections 109 and 110 to the right of the section 108. In addition, the energy direction, in the event of an excess current, can be from left to right in one case and from right to left in another case in a certain section, depending upon the position of the short circuit in the power line 100. However, since as already explained with reference to the first embodiment those sections unaffected by a short circuit have to be reconnected to their adjacent energy source 2* or 2** following isolation of the section affected by the short circuit, the corresponding signals from the transmitters associated with the individual switches or with their switch-operating means have to be delivered in one case to the switch situated to the left thereof or its receiver and, in another case, to the switch situated to the right thereof or to the receiver associated with it. This change in direction in the transmitted signals or in the transmission channels provided for them must take place in dependence of the energy direction which has prevailed at the corresponding switch during the occurrence of an excess current. Accordingly, the control means 112 to 115 are each provided for this purpose with a directional relay with which a two-way contact is associated. By means of this two-way contact, the associated transmission channels are switched to the particular transmission direction required.

Transmission channels 136 and 137 run from the transmitter 128 of the switch 102 to the switches 8 and 103 adjacent to it in the direction of the first and second energy sources 2* and 2** or, as illustrated, to the associated receivers 54 and 133.

Transmission channels 138 and 139 run from the transmitter 129 of the switch 103 to the switches 102 and 104 adjacent to it in the direction of the first and second energy sources 2* and 2** or, as illustrated, to the associated receivers 132 and 134.

Transmission channels 140 and 141 run from the transmitter 130 of the switch 104 to the switches 103 and 105 adjacent to it in the direction of the first and second energy sources 2* and 2** or as illustrated, to the same associated receivers 133 and 135.

Transmission channels 142 and 143 run from the transmitter 131 of the switch 105 to the switches 104 and 8' adjacent to it in the direction of the first and second energy sources 2* and 2** or as illustrated to the associated receivers 134 and 54'.

In the event of an excess current of the kind detected by the monitoring means 120 to 125 associated with each switch, the energy direction prevailing in each of the switches 102 to 105 is detected and temporarily stored by means of the directional relays 124 to 127 associated with these switches. In dependence upon the energy direction detected and temporarily stored, the output of the transmitter associated with each of the aforementioned switches is connected by the reversing switch controlled by the associated directional relay to the particular transmission channel running oppositely to the energy direction detected.

Figure 3:
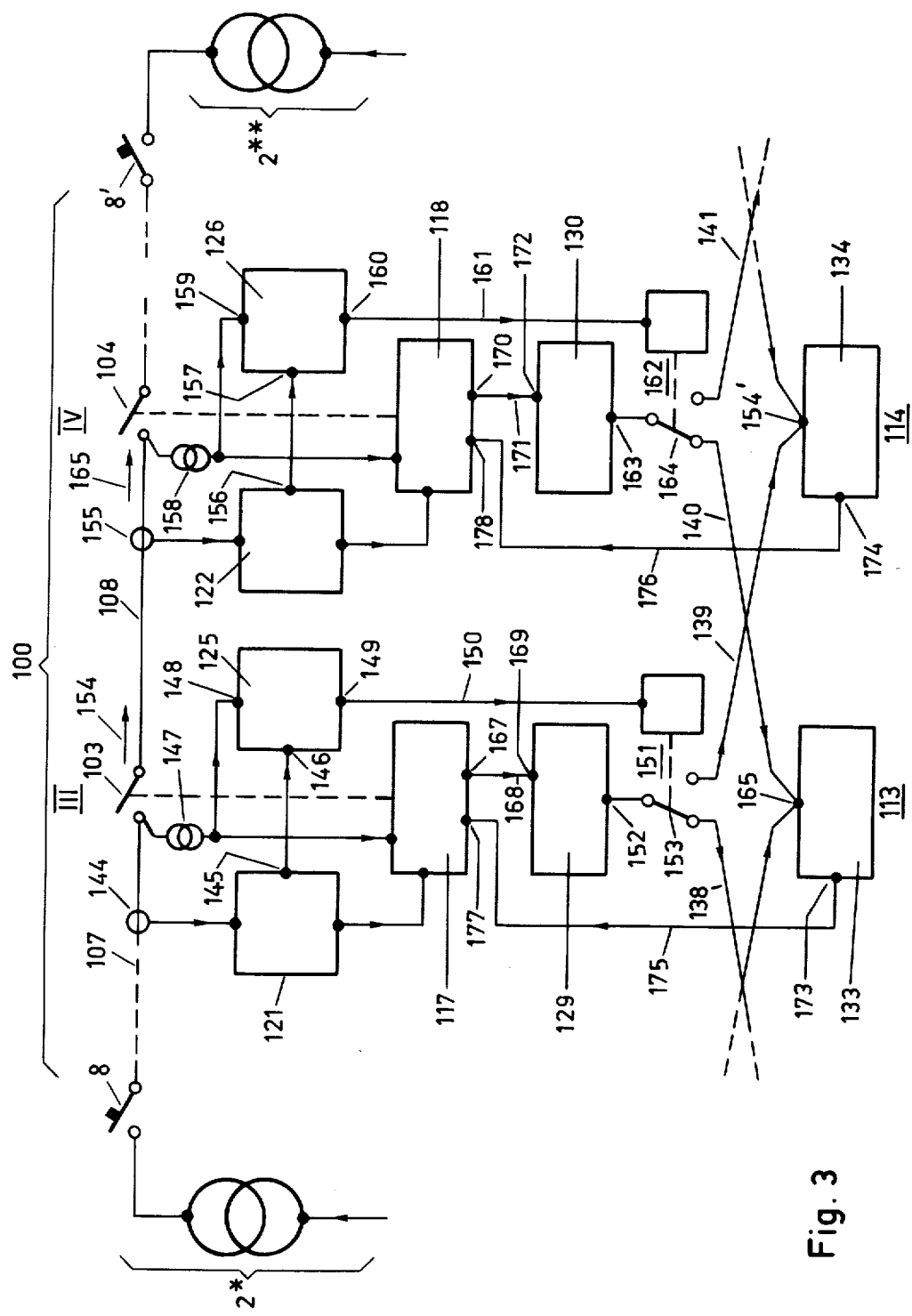
FIG. 3 shows in greater details part of the block circuit diagram illustrated in FIG. 2.

FIG. 3 shows a detail of FIG. 2, namely the switches 103 and 104 arranged at points III and IV of the power line 100, together with the control means 113 and 114 associated with them, and in particular the switchover of the associated transmission channels.

The monitoring means 121 of the switch 103 is connected to the power line 100 through a current transformer 144 present in the section 107 associated with the switch 103. A signal corresponding to the current in the power line 100 associated with the switch 103 is delivered from the output 145 of the monitoring means 121 to a first input 146 of the directional relay 125 associated with the switch 103. A signal corresponding to the voltage in the power line 100 associated with the switch 103 is delivered from a voltage transformer 147 connected thereto to a second input 148 of the directional relay 125.

From its output 149, the directional relay 125 controls the reversing switch 153 associated with the output 152 of the transmitter 129 through a control connection 150 and a drive 151 in dependence upon the energy direction in the power line 100. If, in the event of an excess current at the switch 103, the energy direction is in the direction of the arrow 154, the reversing switch 153 is switched to the transmission channel 138 (cf. also FIG. 2), and if the energy direction is opposite to the arrow 154 it is switched to the transmission channel 139 and, hence, to the input 154' of the receiver 134 associated with the switch 104.

The monitoring means 122 of the switch 104 is connected to the power line 100 through a current transformer 155 present in the section 108 associated with the switch 104. A signal corresponding to the current in the power line 100 is delivered from the output 156 of the monitoring means 122 to a first input 157 of the directional relay 126 associated with the switch 104. A signal corresponding to the voltage in the power line 100 at the switch 104 is delivered from a voltage transformer 158 connected thereto to a second input 159 of the directional relay 126. From its output 160, the directional relay 126 controls the reversing switch 164 associated with the output 163 of the transmitter 130 through a control connection 161 and a drive 162 in dependence upon the energy direction in the power line 100. If, in the event of an excess current at the switch 104, the energy direction is in the direction of the arrow 165, the reversing switch 164 is switched to the transmission channel 140 and hence to the input 165 of the receiver 133 associated with the switch 103. If the energy direction prevailing in the event of an excess current is opposite to the arrow 165, the switch 164 is switched to the transmission channel 141 and, hence, to the receiver 135 associated with the following switch 105 (cf. also FIG. 2).

One output 167 of the switch-operating means 117 associated with the switch 103 is connected through a control connection 168 to a control input 169 of the transmitter 129 associated with the switch 103.

The arrangement is such that the transmitter 129 only emits a signal at its output 152 for at least a certain period when the switch 103 is opened or is held in its open position.

One output 170 of the switch-operating means 118 associated with the switch 104 is connected through a control connection 171 to a control input 172 of the transmitter 130 associated with the switch 104. The arrangement is such that the transmitter 130 only emits a signal at its output 163 for at least a certain period when the switch 104 is opened or is held in its open position.

Through the intervention of the reversing switch 153 or 164 associated with the output 152 of the transmitter 129 or with the output 163 of the transmitter 130, the signal of the transmitter concerned always passes, as already described, to an adjacent receiver through a transmission channel directed opposite to the energy direction prevailing in the power line in the event of an excess current.

Transmission channels 136 and 137 run from the transmitter 128 of the switch 102 to the switches 8 and 103 adjacent to it in the direction of the first and second energy sources 2* and 2** or, as illustrated, to the associated receivers 54 and 133.

Transmission channels 138 and 139 lead from the transmitter 129 of the switch 103 to the switches 102 and 104 adjacent to it in the direction of the first and second energy sources 2* and 2** or, as illustrated to the associated receivers 132 and 134.

Transmission channels 140 and 141 run from the transmitter 130 of the switch 104 to the switches 103 and 105 adjacent to it in the direction of the first and second sources 2* and 2** or, as illustrated, to the associated receivers 133 and 135.

Transmission channels 142 and 143 run from the transmitter 131 of the switch 105 to the switches 104 and 8' adjacent to it in the direction of the first and second energy sources 2* and 2* or, as illustrated, to the associated receivers 134 and 54'.

At each of the switches 103, 103, 104 and 105, the energy direction prevailing in the power line in the event of an excess current of the kind detected by the associated monitoring means 120, 121, 122 and 123, is detected by means of the directional relays 124, 125, 126 and 127 associated with each of these switches. Depending on the energy direction detected, the transmission channel directed opposite to the aforementioned energy direction is switched to the adjacent receiver at each of the transmitters associated with the aforementioned switches by means of the reversing switches controlled by the associated directional relay. In this way, each transmitter is connected to the adjacent receiver in the direction opposite to the aforementioned energy direction. However, these receivers 133 and 134 are connected at their outputs 173 and 174 through control connections 175 and 176 to other inputs 177 and 178 of the switch-operating means 117 to 118 associated with the associated switch.

The connections and relations existing between two adjacent switches in the power line, explained above with reference to FIG. 3, also prevail correspondingly between the other switches of the power line. In summary, therefore, the switching condition of any of these switches is controlled by its switch-operating means which both receives information as to whether the particular switch can be opened from the monitoring means associated with the particular switch and its switch-operating means, and which receives from the receiver associated with the aforementioned switch, in the event of or shortly after an excess current, further information as to whether the switch in question is to remain in its open position or is to be closed. This information of the receiver of a certain switch concerning the switch position to be assumed is based on the reception or non-reception of a signal from the transmitter of an adjacent switch in the power line. In this embodiment, this transmitter emits a signal in dependence upon the position of the switch associated with it. The transmission direction of the signal released by the transmitter to the receiver of the adjacent switch is always opposite to the energy direction prevailing in the power line in the event of an excess current. In cases where energy is fed in on one side only, i.e., when only one energy source is provided at the end of the power line, this energy direction is fixed from the outset, so that the aforementioned transmission channels between the transmitter of a switch and the receiver of an adjacent switch need only be connected once. In cases where energy is fed in on both sides, the energy direction prevailing at a switch in the event of a fault depends on which section of the power line is affected by the fault or by a short circuit. Therefore, in such cases, the particular energy direction has to be detected by directional relays and the output of the transmitter of each switch has to be suitably transferred to a transmission channel in one or the other direction.

It follows from the interrelationship illustrated above that, in a power line affected by an excess current, the circuit breaker or breakers provided at the beginning and/or end of the power line open first, followed by the on-load switches or isolators present in that power line. The power line is divided up into its individual sections by opening of the on-load switches or isolators. The switches which opened in the order in which the excess current occurred are then closed again, except for those switches situated in the affected section itself. Finally, the circuit breaker(s) provided at the beginning and/or end of the power line are closed and, hence, the power line placed under voltage again up to, but excluding, the faulty section.

Figure 4:
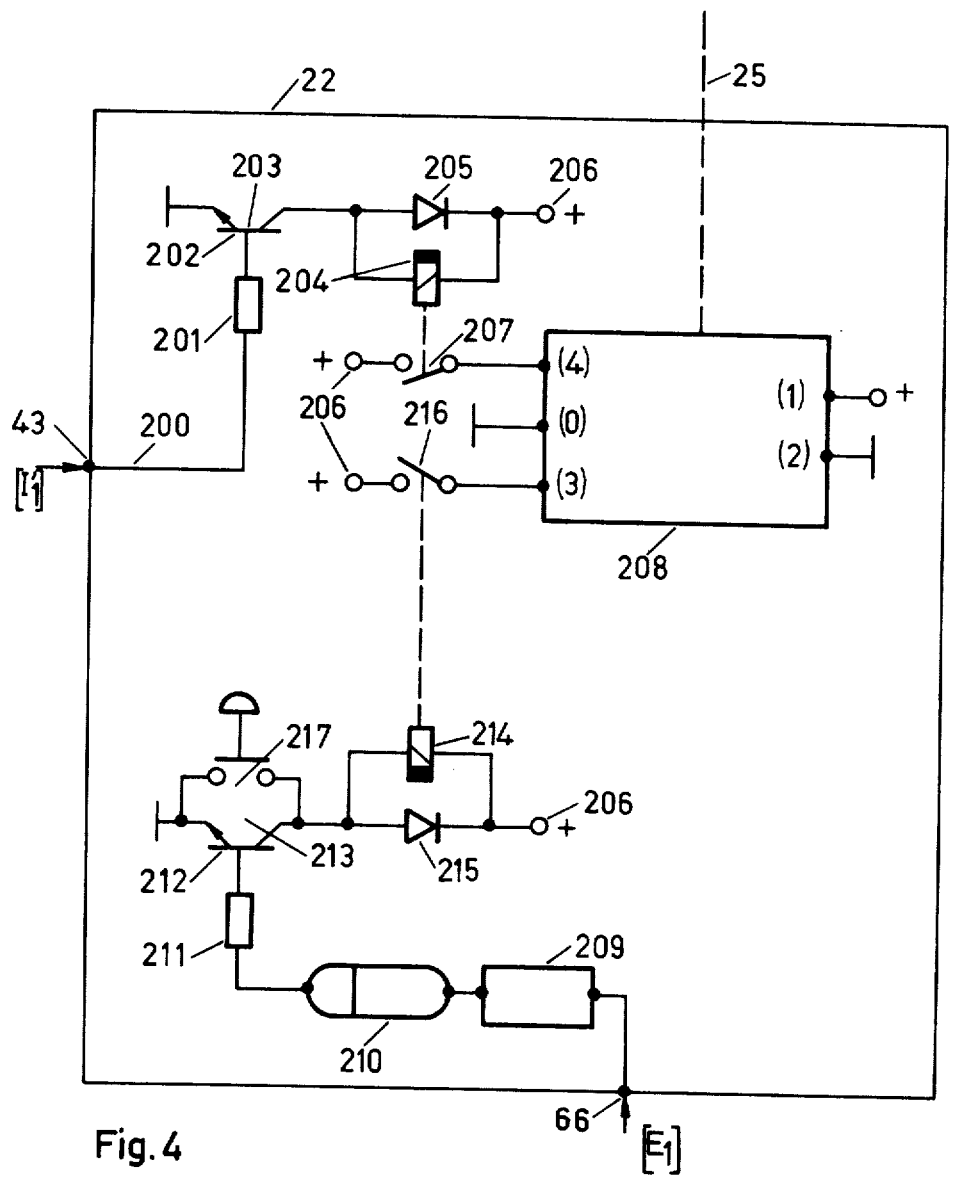
FIG. 4 shows one embodiment of a switch-operating means for a circuit breaker.

FIG. 4 shows one embodiment of a switch-operating means 22 for a circuit breaker 8 (the switch operating means 22' for the circuit breaker 8' would be similar). The switch-operating means 22 has a first input 43 and another input 66 (cf. also FIG. 1), and is connected with the associated switch 8 (not shown in FIG. 4) through the coupling element 25. The input signal $I_1'$ is delivered from the first input 43 through a line 200 and a resistor 201 to the base 202 of a transistor 203 whose collector circuit includes a delayed drop-out relay 204. The winding of the relay 204 is shunted with a diode 205 to protect the transistor 203 against inductive voltage peaks. In addition, the relay 204 is connected to the positive terminal 206 of a d.c. voltage source (not shown in FIG. 4). A contact 207 is associated with the relay 204. Through this contact 207 the voltage present at the positive terminal 206 in the closed position is applied to an input (4) of a switch drive 208. One example of a suitable switch drive 208 is the switch drive manufactured by Messrs. Sprecher und Schuh AG, Aarau, Switzerland, with motor spring drive FK2-40 (Catalogue 410 5, Jan. 1971, Pages 3 and 4). Another input (0) of the switch drive 208 is connected to zero potential. From the other input 66, a signal $E_1$ applied to it passes through a timing element 209, a delay element 210 and a resistor 211 to the base 212 of a transistor 213. The collector circuit of the transistor 213 includes a delayed drop-out relay 214 which in turn is connected to the positive terminal 206 of the voltage source (not shown). The winding of the relay 214 is shunted in known manner with a diode 215 in order to protect the transistor 213 against inductive voltage peaks. In the closed position, a normally-open contact 216 associated with the relay 214 applies the positive voltage of the positive terminal 206 to an input (3) of the switch drive 208. Accordingly, the switch drive 208 can be made, by the input signal $I_1'$ at the first input 43, to switch off the associated switch and, by the signal $E_1$ at the other input 66, to switch on the associated switch. In addition, a keying contact 217 is provided for manually closing the switch associated with the switch drive 208 when this keying contact 217 is actuated by the switch drive 208. This takes place, for example, following elimination of a fault in the power line. Examples of a timing element 209 and delay element 210 are described below with reference to FIGS. 13 and 14.

A switch-operating means of the kind described with reference to FIG. 4 is suitable for circuit breakers, for example for the switch 8 indicated in FIG. 1, and for the switches 8 and 8' in FIG. 3.

One embodiment of a switch-operating means 23 will now be described with reference to FIG. 5. A switch-operating means of this kind is suitable for an on-load switch of the kind denoted by the references 14 and 19 in FIG. 1 and by the references 102, 103, 104 and 105 in FIG. 2; in other words the switch-operating means 24, 116, 117, 118, 119 can all be the same. Referring to the switch-operating means 23 illustrated in FIG. 5, an input signal $I_2'$ is delivered from the first input 44 through a line 220 and through an inverter 221 to a first input 222 of an AND-gate 223 and in addition, through a timing element 224 and a delay element 225 to another input 226 of the AND-gate 223. Embodiments of a timing element 224 and of a delay element 225 are described below with reference to FIGS. 13 and 14, respectively. The output 227 of the AND-gate 223 is connected through a resistor 228 to the base 229 of a transistor 230 whose collector circuit includes a delayed drop-out relay 231 and which is connected to the positive terminal 232 of a voltage source (not shown). The winding of the relay 231 is shunted with a diode 233 to protect the transistor 230 against inductive voltage peaks. A normally open contact 234 is associated with the relay 231. In its closed position, this contact applies the positive voltage of the positive terminal 232 of the aforementioned voltage source to an input (0) of a compressed-air drive 235. One example of a suitable compressed-air drive is the type GD 1-1 drive with a compressed-air control valve manufactured by Messrs. Sprecher und Schuh AG, Aarau, Switzerland. A compressed-air drive of this kind is described in this firm's catalogue 6A (12.66), page 35.

A signal $E_2$ delivered to the other input 65 is transmitted through a line 236 and a resistor 237 to a base 238 of a transistor 239. The collector circuit of the transistor 239 incorporates a delayed drop-out relay 240 which is also connected to the positive terminal 232 of the voltage source (not shown). The winding of the relay 240 is shunted with a diode 241 in order to protect the transistor 239 against inductive voltage peaks. A normally open contact 242 is associated with the relay 240. In its closed position, this contact 242 applies the positive voltage of the positive terminal 232 to an input (I) of the compressed-air drive.

By means of the compressed-air drive 235, a signal $I_2'$ at the first input 44 causes the associated switch to move to the off position whereas a signal $E_2$ at the other input 67 causes the associated switch to move to the on position. In addition, a keying contact 243 is associated with the transistor 239, so that, when this contact 243 is actuated, the collector and emitter of the transistor 239 can be connected to one another. Accordingly, the compressed-air drive 235 also can be manually brought into operation by actuating the keying contact 243, so that the associated switch can be switched on again, for example following the elimination of a fault in the power line.

The switch-operating means 23 further comprises a switch 244 operable by the compressed-air drive 235 through the coupling element 26. The switch 244 is such that it is closed when the switch associated with it in the power line is open, and vice versa.

By means of the switch 244, a d.c. voltage can be delivered from a positive terminal 245 of another voltage source (not shown) through a line 246 to the output 48 of the switch-operating means 23. Accordingly, positive voltage is delivered to the transmitter 46 through the switch 244 and the output 48 (cf. also FIG. 1).

Figure 6:
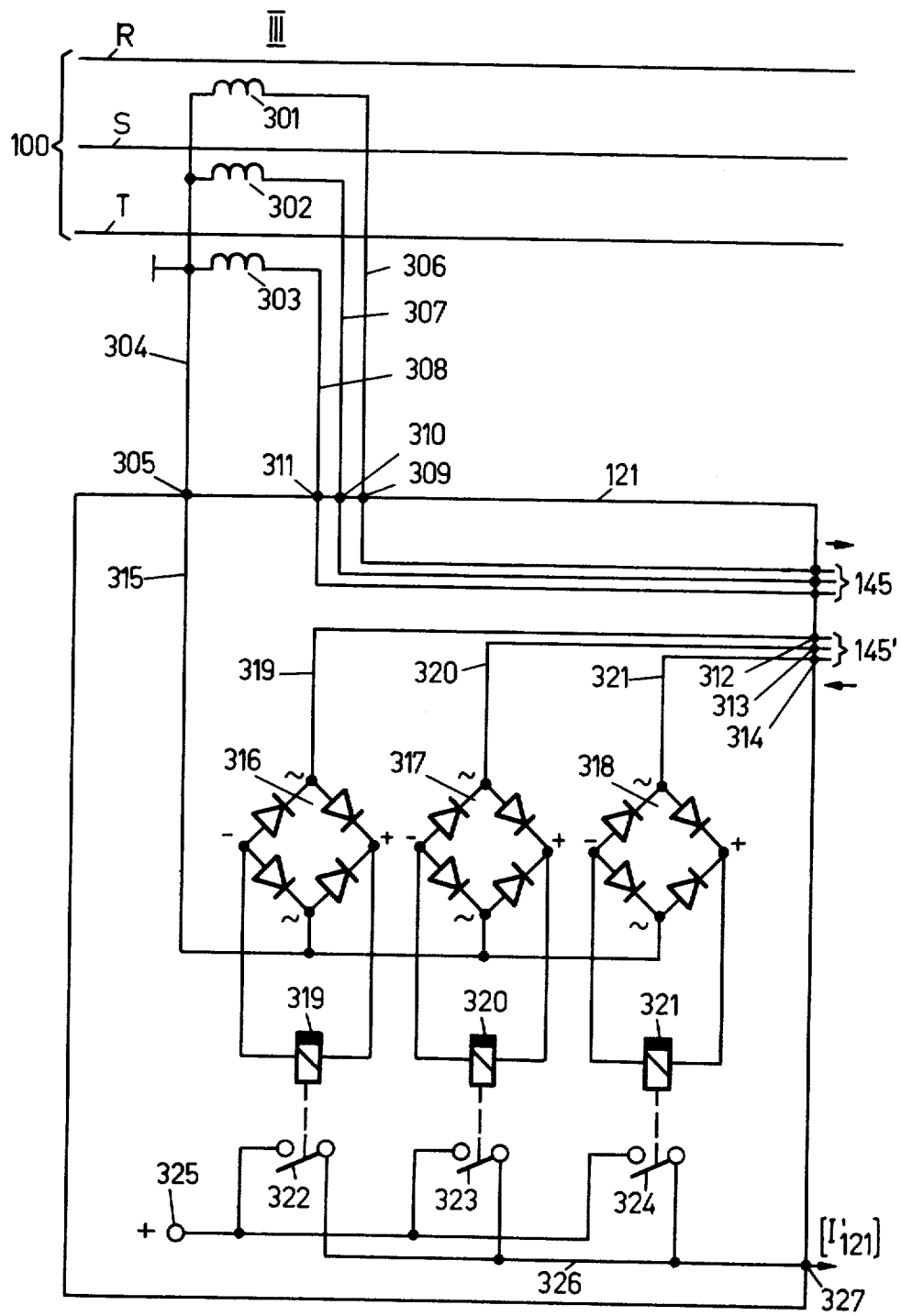
FIG. 6 shows one embodiment of a monitoring means.

One embodiment of a monitoring means 121 will now be described with reference to FIG. 6. The other monitoring means 120, 122 and 123 appearing in FIGS. 1 to 3 are similar in structure. The monitoring means 121 is connected to the power line 100 at point III. The power line 100 comprises the three phase conductors R, S and T. Three current transformers 301, 302 and 303 are coupled to these phase conductors. One end of each of the secondary windings of these current transformers is connected to a line 304 which leads to an input 305 of the monitoring means 121. The other ends of the secondary windings of the aforementioned current transformers are respectively connected through lines 306, 307 and 308 to inputs 309, 310 and 311 of the monitoring means 121. These inputs 309, 310, 311 are each connected through the output 145 to one end of a current coil of the directional relay 125 (cf. FIG. 3) associated with the monitoring means 121 (not shown in FIG. 6). The other ends of the aforementioned current coils in the directional relay 125 are connected to the monitoring means 121 through an input 145' consisting of the terminals 312, 313 and 314.

If a switch-operating means is provided in a power line fed from one side only i.e., of the kind illustrated in FIG. 1, there is no need to use a directional relay, as mentioned earlier on. In such case, the inputs 309, 310, 311 are directly connected to the terminals 312, 313 and 314 of the monitoring means 121.

A line 315 leads from the input 305 to an alternating-current terminal of three full-wave rectifiers 316, 317 and 318 associated with each of the phase conductors R, S and T. The other alternating-current terminals of these full-wave rectifiers are connected through lines 319, 320 and 321 to the inputs 312, 313 and 314. Accordingly, the secondary current of the current transformers 301, 302 and 303 is delivered to the full-wave rectifiers 316, 317 and 318 through the current coils of the directional relay 125 (if present).

Delayed drop-out relays 319, 320 and 321 are connected to the direct-current terminals of the full-wave rectifiers 316, 317 and 318. The relays 319, 320 and 321 are such that they only respond in the event of an excess current in the particular phase conductors R, S and T associated with them, and in that event close their associated normally open contacts 322, 323 and 324. These contacts 322, 323 and 324 are connected to the posititive terminal 325 of a voltage source (not shown in FIG. 6) whose negative terminal is connected to earth. The contacts 322, 323 and 324 are also connected to a line 326 which leads to an output 327. Accordingly, the output 327 only ever carries a positive voltage or the signal logic 1 when an excess current occurs in at least one of the phase conductors R, S and T.

One embodiment of a transmitter 46 (cf. FIG. 1) will now be explained with reference to FIG. 7. When the switch 14 is open, a signal logic 1 is delivered to the input 52 of the transmitter 46. This signal emanates from the output 48 of the switch-operating means 23 (cf. FIG. 1). Accordingly, this signal is indirectly governed by the occurrence of an excess current in the power line.

The aforementioned signal is delivered from the input 52 through a line 350 to a timing element 351. A monostable multivibrator 354 is connected through a line 353 to an output 352 of the timing element 351. One example of a suitable monostable multivibrator is the type SN74121 integrated circuit manufactured by Messrs. Texas Instruments Corp., U.S.A. In FIG. 7, the terminals of the type SN74121 integrated circuit are shown in brackets in the symbol of the monostable multivibrator 354. The (Q) output of the integrated circuit of the multivibrator 354 is connected through a series circuit comprising two inverters 355 and 356 to the (A2) input of the aforementioned integrated circuit as feedback path. The pulse duration of the monostable multivibrator 354 is determined by a capacitor 357 connected to terminals (10) and (11) of the aforementioned integrated circuit, and a resistor 358 connected to terminals (11) and (14). A signal logic 1 or the positive feed voltage of a terminal 359 is permanently applied from a current source (not shown in FIG. 7) to the terminals (A1) and (14) of the SN74121 integrated circuit of the monostable multivibrator 354. The pulses appearing at the ($\overline{Q}$) output of the monostable multivibrator 354 are delivered through a line 360 to the clock input (CL) of a flip flop 361. One example of a suitable flip flop is the type SN7473 integrated circuit manufactured by Messrs. Texas Instruments Corp., U.S.A. The signal logic 1 is delivered from the terminal 359 to the (J) and (K) terminal of the type SN7474 integrated circuit of the flip flop 361. At its (Q) output, the type SN7473 integrated circuit of the flip flop 361 emits a square-wave signal with the transmitting frequency $f_s$ selected for the transmitter 46 through a line 362 to a first input 363 of an AND-gate 364. The output signal of the timing element 351 is delivered from its input 352 to another input 365 of the AND-gate 364 through a line 366. Accordingly, a square-wave signal with the frequency $f_s$ appears at the output 367 of the AND-gate 364 throughout the period during which the output signal of the timing element 351 has the signal logic 1.

This square-wave signal is delivered through a capacitor 368 to the input 369 of a power amplifier 370, the input 369 also being connected to earth through a resistor 371. Any known pushpull power amplifier with an output of about 100 watts can be used as the power amplifier 370.

A line 373 leads from the output 372 of the power amplifier 370 through a normally open contact 374 of a relay 375 to a series-tuned circuit, tuned to the transmitting frequency $f_S$, consisting of an inductor 376 and a capacitor 377 to the output 56 of the transmitter 46.

By means of the relay 375, the output 372 of the power amplifier 370 is only connected through the aforementioned series-tuned circuit to the output 56 of the transmitter 46 when the signal logic 1 appears at the output 352 of the timing element 351. To this end, the relay 375 is included in the collector circuit, connected to the terminal 359, of a transistor 378 whose base 379 is connected through a resistor 380 and a line 381 to the output 352 of the timing element 351. The winding of the relay 375 is shunted with a diode 382 to protect the transistor 378 against inductive voltage peaks. Another normally open contact 383 is associated with the relay 375, its terminals 384 and 385 being connected to terminals 386 and 387 of the transmitter 46. As is discussed below this other normally open contact 383 is used for connection of the associated receiver during the transmitting time of an adjacent transmitter. The other transmitters 47 and 128 to 131 can be made in the same way.

Figure 8:
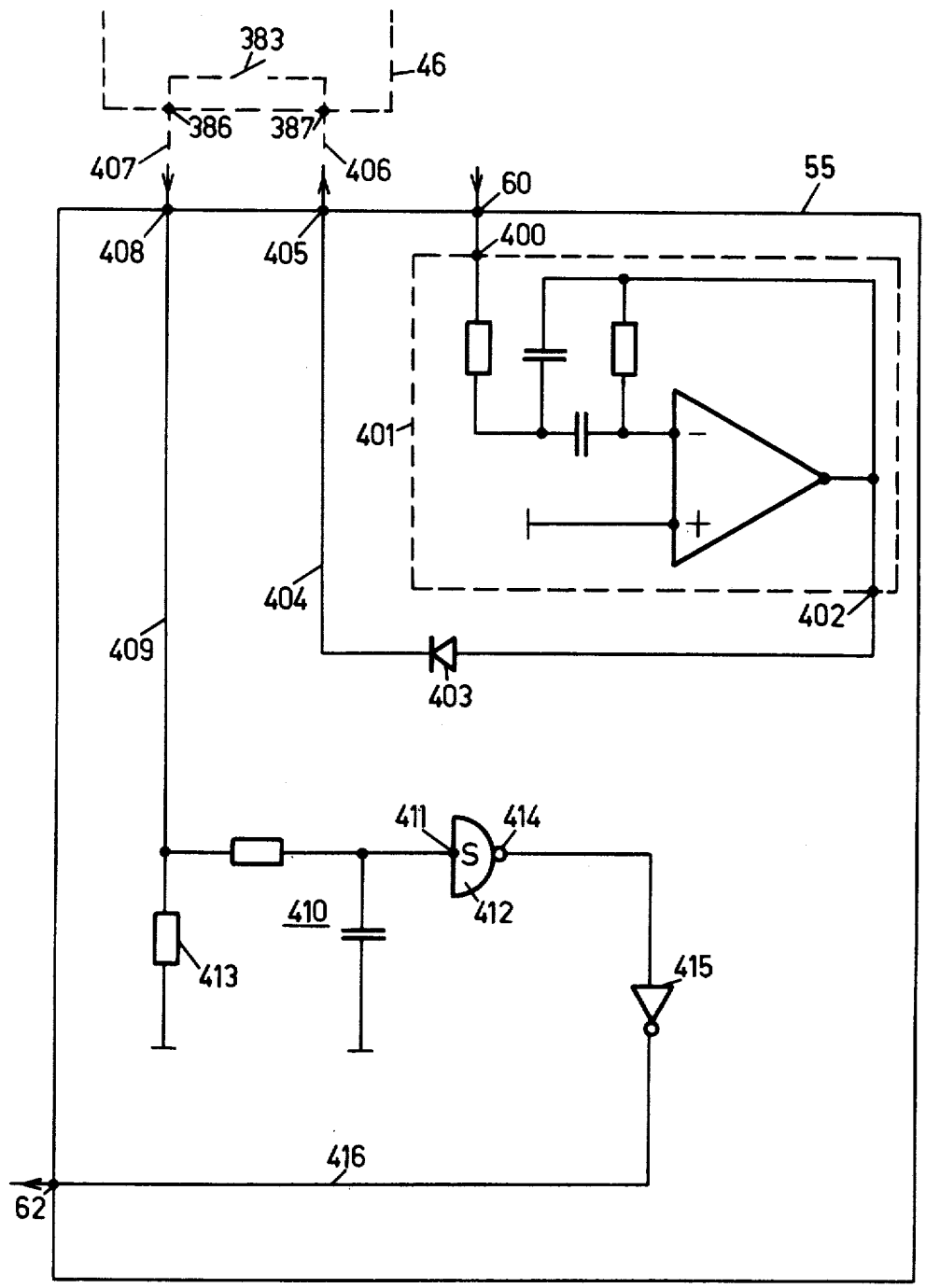
FIG. 8 shows one embodiment of a receiver.

One embodiment of a receiver 55 will now be described with reference to FIG. 8. A signal delivered to the receiver 55 is transmitted from the input 60 to an input 400 of a receiving filter 401. Any active RC-filter can be used as the receiving filter 401, cf. for example Huelsman, Theory and design of active RC-Circuits, McGraw Hill Series in Electronic Systems, Library of Congress Catalogue Card Number 68 - 14756, Pages 198 .... 200, Example 6.6.

A diode 403 is connected to an output 402 of the receiving filter 401 in order to rectify the received signal. The rectified signal is delivered through a line 404, a terminal 405 and a line 406 to the terminal 387 of the transmitter 46. (cf. FIG. 7). When the normally-open contact 383 in the transmitter 46 is closed, the aforementioned rectified signal passes through the contact to the terminal 386 of the transmitter and, from there, through a line 407 to an input terminal 408 of the receiver 55. A line 409 leads from the input terminal 408 through an RC-section 410 to the input 411 of a Schmitt-Trigger 412. One example of a suitable Schmitt trigger is the type SN 7413 integrated circuit manufactured by Texas Instruments Corp., U.S.A. A leakage resistance 413 is associated with the Schmitt trigger 412. The signal appearing at the output 414 of the Schmitt trigger 412 is passed through an inverter 415 and delivered in inverted form through a line 416 to the output 62 of the receiver 55. One example of a suitable inverter is the type SN7404 integrated circuit manufactured by Messrs. Texas Instruments Corp., U.S.A. The other receivers 54, 54' and 132 to 135 can be similar.

Figure 9:
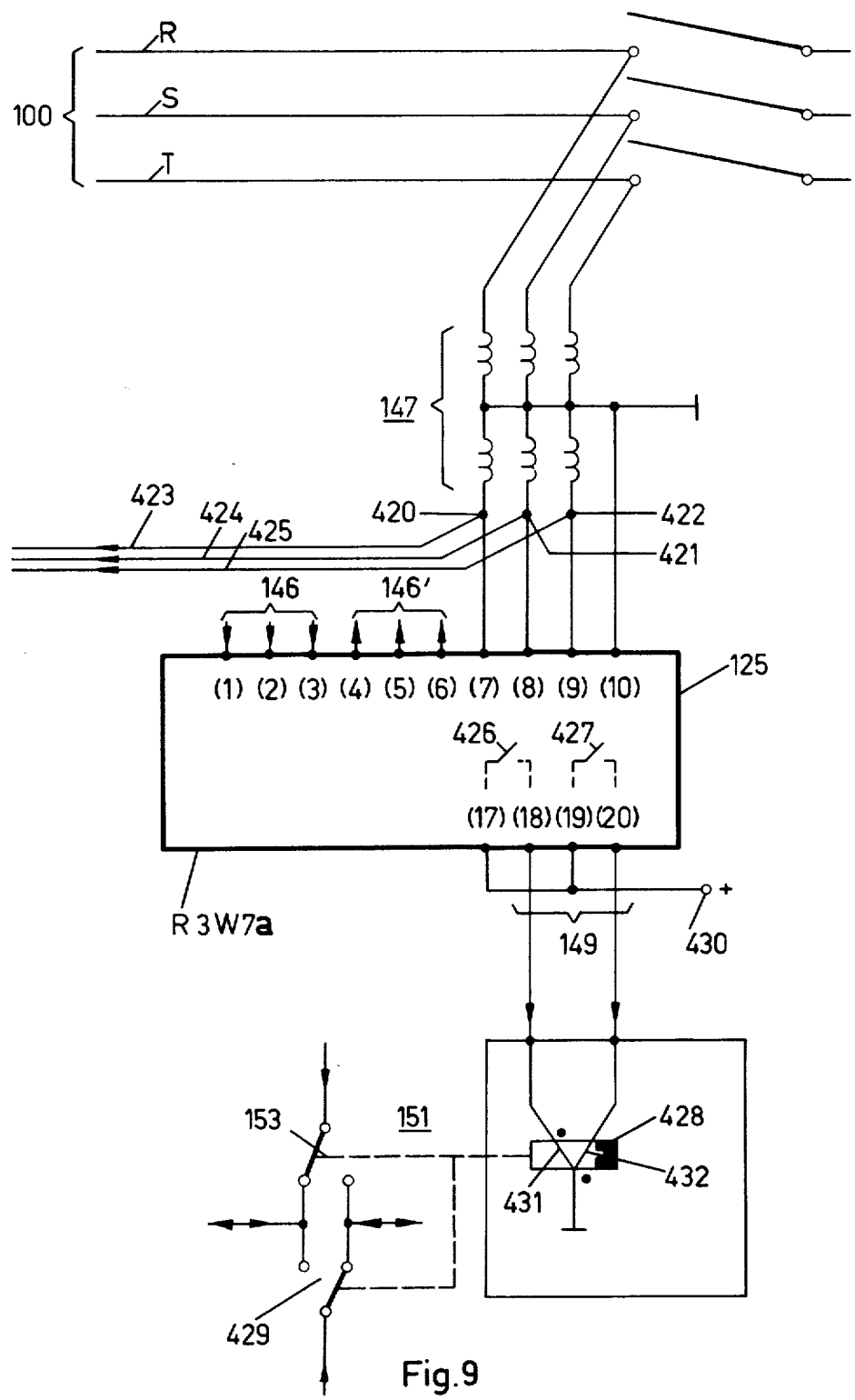
FIG. 9 shows one embodiment for the connection of the directional relay.

One embodiment of the connection of the directional relay 125 will now be described with reference to FIG. 9. In FIG. 9, the terminals of the directional relay, Siemens type R3W7a, are denoted by bracketed references. The other directional relays 124, 126 and 127 can be similar.

The three-phase voltage transformer 147 is connected to the power line 100 having phase conductors R, S and T, its secondary windings being connected to the terminals (7), (8), (9) and (10) of the directional relay 125.

Figure 11:
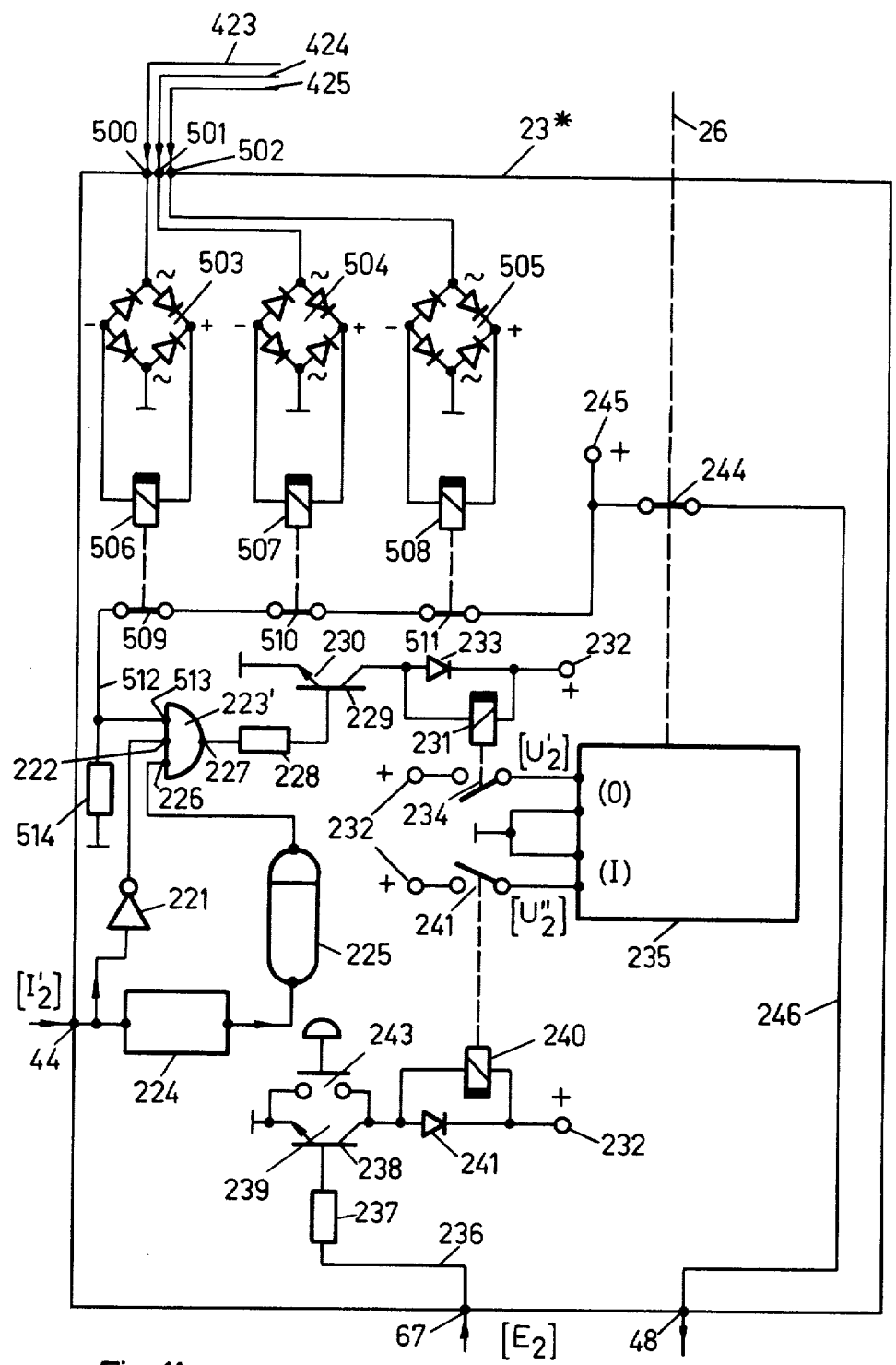
FIG. 11 shows one embodiment of a switch-operating means for an isolating switch.

Three lines 423, 424 and 425, whose significance are explained below with reference to FIG. 11, are connected to the secondary terminals 420, 421 and 422 of the voltage transformer 147. At the input 146 of the directional relay 125, the three current transformers 301, 302 and 303 (cf. FIG. 6) are connected to the current input terminals (1), (2), (3). The current input terminals (4), (5), (5), i.e. the output 146' of the directional relay 125, are connected to the input 145' of the monitoring means 121 (cf. FIG. 6).

Switching contacts 426 and 427 are associated with the two possible energy directions in the directional relay 125, closing in the associated energy direction. The output terminals (17), (18) are associated with the switching contact 426, whereas the output terminals (19), (20) are associated with the switching contact 427. The output terminals (18) and (20) together form the output 149. It is used for connecting the drive 151 of the reversing switch 153 for switching the transmission channel of the transmitter 129 (cf. also FIG. 3).

In the present embodiment, the drive 151 is in the form of a polarised bistable relay 428. The output terminals (17) and (19) of the directional relay 125 are connected to the positive terminal 430 of a voltage source (not shown in FIG. 9). Depending upon the energy direction, this voltage is delivered through the output terminal (18) or (20) either to the winding 431 or to the winding 432 of the polarised bistable relay 428, with the result that the reversing switches 153 and 429 associated with it are switched into one or other position.

The first reversing switch 153 is used for switching the output 152 of the transmitter 129 to the transmission channel 138 or 139 (cf. FIG. 3). The other reversing switch 429 is used for connecting the associated receiver 133 to the particular transmission channel required, as explained hereinafter with reference to FIG. 12.

Two forms of switch-operating means similar to those already described with reference to FIGS. 4 and 5, will now be described with reference to FIGS. 10 and 11.

Figure 10:
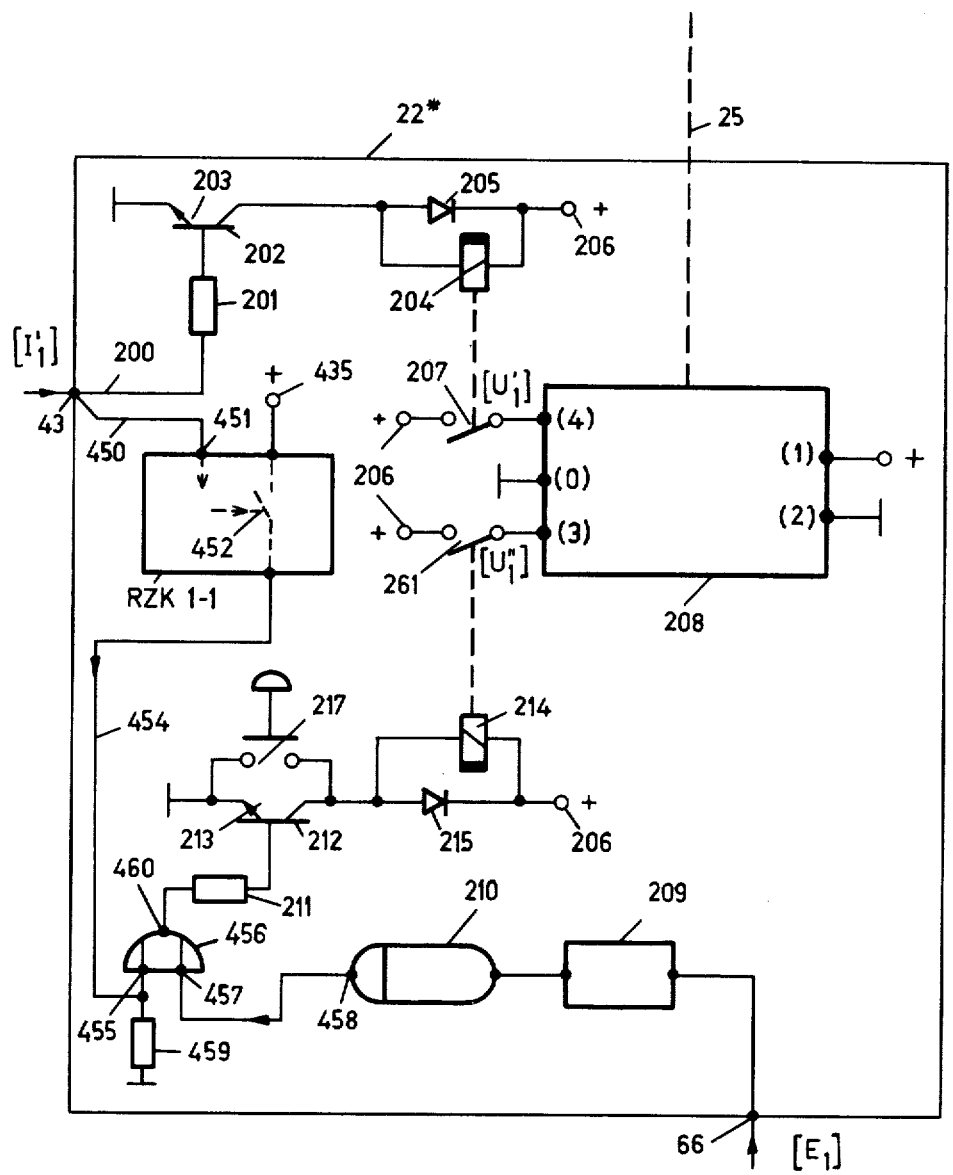
FIG. 10 is a circuit diagram of a switch-operating means suitable for a circuit breaker with a fast reclose characteristic.

FIG. 10 is a circuit diagram of a switch-operating means 22 which is suitable for operating a circuit breaker, for example 8 or 8', and which in the present case are modified in relation to the embodiment illustrated in FIG. 4 in order to obtain automatic reclose. Insofar as FIG. 10 overlaps with FIG. 4, the corresponding components in both Figures are provided with the same reference characters. In addition, the switch-operating means illustrated in FIG. 10 comprises a conventional automatic fast reclose mechanism, for example type RZK 1—1 manufactured by Messrs. Sprecher und Schuh AG, Aarau, Switzerland. An input signal $I_1'$ applied to the input 43 of the switch-operating means 22 is delivered through a line 450 to an input 451 of the device RZK 1—1. Under the effect of this signal, the automatic reclose device closes a switch 452 present in it after a delay and, as a result, applies, a d.c. voltage present at a terminal 453 through a line 454 to a first input 455 of an OR-gate 456. The other input 457 of this OR-gate 456 is connected to the output 458 of the delay element 210. In addition, the first input 455 of the OR-gate 456 is connected to earth through a resistor 459. The output 460 of the OR-gate 456 is connected to the resistor 211 which has already been mentioned with reference to FIG. 4.

The arrangement described above with reference to FIG. 10 works as follows. The switch associated with the switch-operating means 22** illustrated in FIG.10 can be switched off with hardly and delay, in the same way as described with reference to FIG. 4, by an input signal $I_1'$ arriving at the input 43 in the event of an excess current in the power line, and switched on with delay by a signal $E_1$ at the input 66. In addition, the automatic fast reclose device RZK 1—1 provides for automatic reclosure of the associated switch 8 shortly after it has been switched off by a first excess-current signal $I_1'$, for example after about 200 milliseconds. If then an excess current is still present, the associated switch 8 is automatically opened in the manner already described and remains open until the siganl $E_1$ arrives at a later stage or until it is manually closed.

Since the device RZK 1—1 and the switch (for example Sprecher und Schuh, type FK 2-40) are known, the other circuitry features which they emobdy, such as reciprocal locking, for switching on and off or for temporary locking, for switch off during automatic winding of the spring drive, are not described in detail here.

A switch-operating means 23* suitable for a switch 14 or 19 or 102 to 105 in the form of an isolator, will now be described with reference to FIG. 11. A switch-operating means of the kind shown in FIG. 11 is suitable for an isolator in a power line designed to be connected by a circuit breaker to an energy source, whether or not this circuit breaker is provided with an automatic fast reclose device.

The circuit shown in FIG. 11 represents another embodiment of the circuit already described with reference to FIG. 5. In FIG. 11, corresponding components have the same reference characters as in FIG. 5. In order to ensure that the associated isolator 14 (cf. FIG. 1) is only ever operated when free from voltage, the lines 423, 424 and 425 mentioned during the description of FIG. 9 are connected to input terminals 500, 501 and 502 of the switch-operating means 23*. One a.c. voltage terminals of each of three full-wave rectifiers 503, 504 and 505 is connected to the aforementioned input terminals 500, 501 and 502, whereas the other a.c. voltage terminal of each rectifier is connected to earth. Delayed drop-out relays 506, 507, 508 are connected to the d.c. voltage terminals of these full-wave rectifiers 503, 504 and 505, their normally-closed contacts 509, 510 and 511 being connected in series and to the positive terminal 245. When the contacts 509, 510 and 511 are closed, the positive voltage of the terminal 245 flows through a line 512 to one input 513 of a three-input AND-gate 223'. In addition, the input 513 is connected to earth through a resistor 514. The other inputs 222 and 226 correspond to the arrangement illustrated in FIG. 5 in regard to their position in the circuit, the same applying to the output 227 of the AND-gate 223'. In other respects, the circuit corresponds to the circuit illustrated in FIG. 5.

It can be seen from the circuit shown in FIG. 11 that, although only one of the phase conductors is under voltage, i.e. although voltage is only flowing through one of the lines 423, 424 and 425, the positive voltage of the terminal 245 does not reach the first input 513 of the AND-gate 223' on account of the fact that one of the contacts 509, 510, 511 is open, so that this gate 223' remains blocked. Thereby, this prevents the associated isolator 14 from being switched off as long as the power line 10 is not without voltage.

Figure 5:
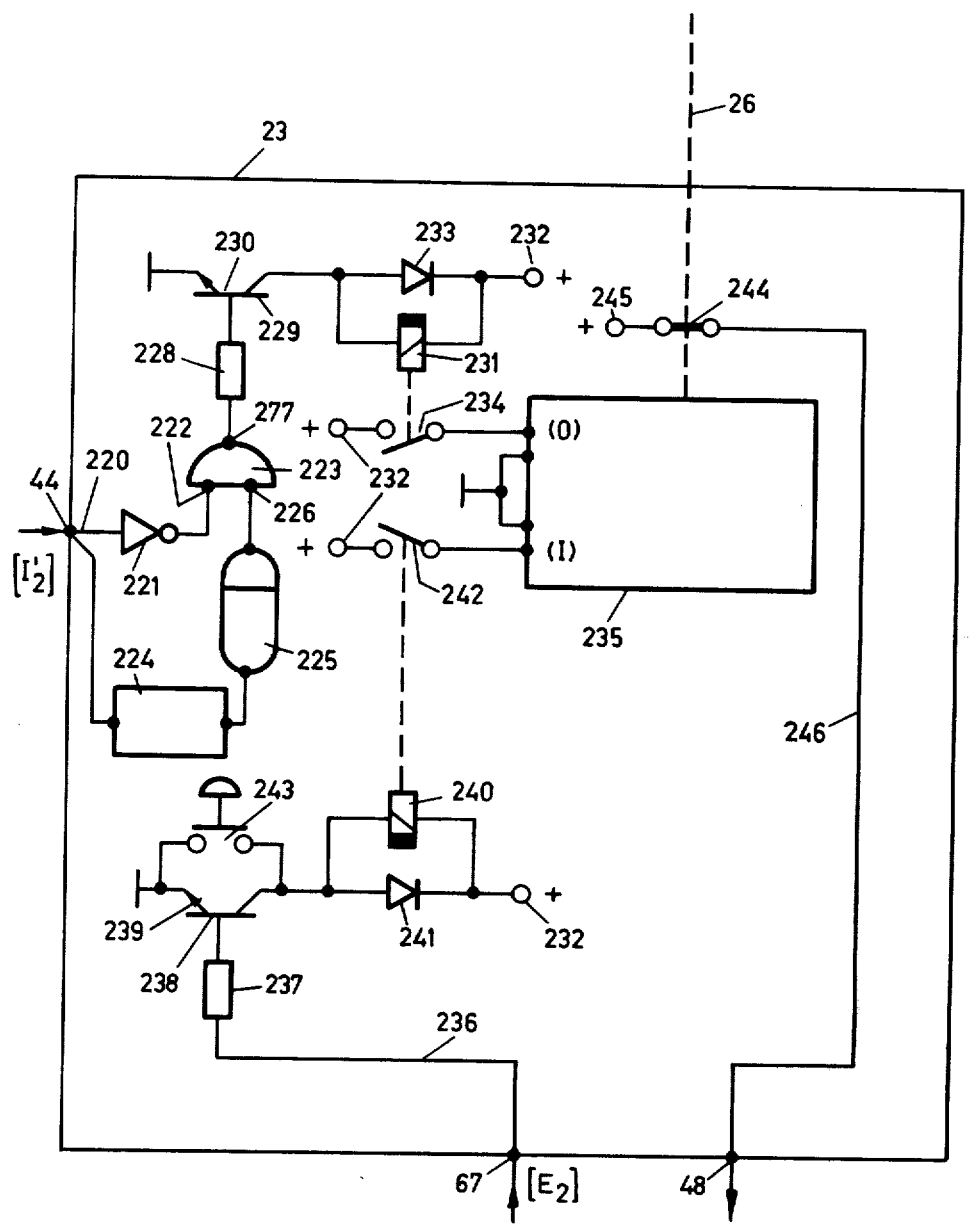
FIG. 5 shows one embodiment of a switch-operating means for an on-load switch.

In addition, the associated switch 14 is prevented from being switched off by the switch drive 235 when an excess current is flowing through the power line 10, as is the case with the switch-operating means 23 shown in FIG. 5. This is because, if a signal $I_2'$ appears at the input 44 of the switch-operating means 23* as a result of the excess current, the signal logic 0 at the input 222 of the AND-gate 223' blocks its outputs 227. As a result, a signal at the input 226 of the AND-gate 223' is unable to act on its output 227, so that the delayed drop-out relay 231 cannot be excited either.

Figure 12:
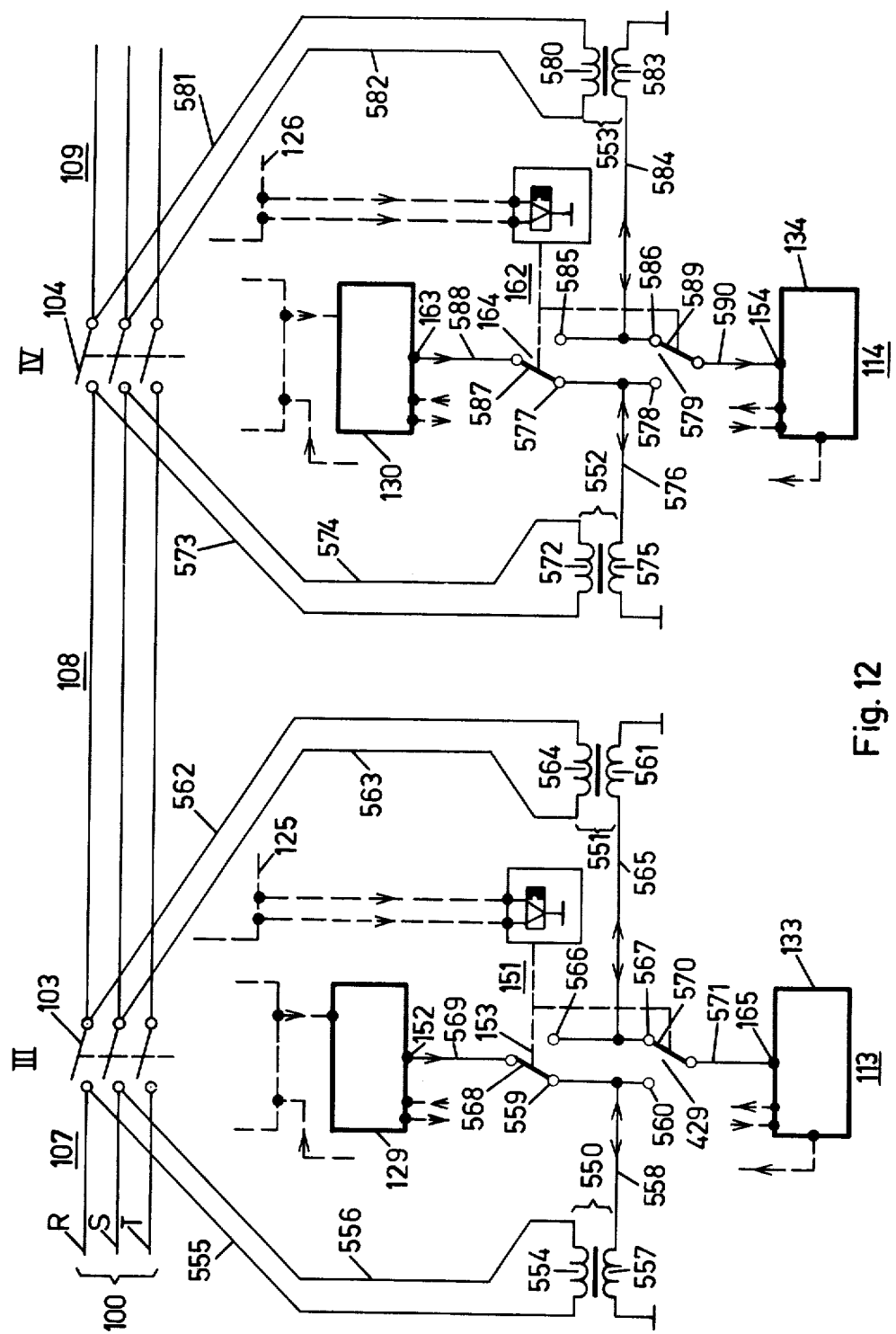
FIG. 12 shows one embodiment of the arrangement of the transmission channels.

FIG. 12 shows one embodiment of the transmission channel between the control means 113 and 114 associated with the switches 103 and 104, audio frequency signals being transmitted through part of the power line 100 (cf. FIG. 3). The arrangement is such that the fault-free section 108 of the power line 100 between the aforementioned switches is part of the transmission channel. FIG. 12 also shows the connection of the coupling element required to the phase conductors R and S of the power line 100. Other parts of the arrangement according to the invention are merely indicated in FIG. 12, because they are of no real significance to the description of the transmission channels.

The control means 113 contains inter alia the transmitter 129 and the receiver 133, whereas the control means 114 contains inter alia the transmitter 130 and the receiver 134. The reversing switches controlled by the associated directional relay which are required for switching the transmission channels have already been described with reference to FIG. 9 in connection with the control means 113. Accordingly, the control means 114 also contains reversing switches associated with the transmitter 130 and the receiver 134.

In the illustration of the transmission channels 139 and 140 in FIG. 3, a separate line is provided for each. An advantageous solution for the transmission channels is illustrated in FIG. 12. In this case, the connection between points III and IV of the power line is provided by two phase conductors, for example R and S. The transmission direction either can be from left to right or from right to left, depending upon the position of the short circuit responsible for the excess current.

However, the same phase conductors R and S of the power line 100 are used in both cases.

The two voltage transformers 550 and 551 are provided at point III of the power line 100 for signal transmission from the transmitter 129 to the phase conductors R and S, and for signal transmission from the phase conductors R and S to the receiver 133. Similarly, the two voltage transformers 552 and 553 are provided at point IV of the power line for the same purpose.

The high-voltage winding 554 of the voltage transformer 550 is connected through a line 555 to the phase conductor R of the section 107 and through a line 556 to the phase conductor S of the section 107. One end of the low-voltage winding 557 of the voltage transformer 550 is connected to earth, and the other end is connected through a line 558 to the left-hand terminal 559 of the reversing switch 153 and to the left-hand terminal 560 of the reversing switch 429. The high-voltage winding 564 of the voltage transformer 551 is connected through a line 562 to the phase conductor of the section 108 and through a line 563 to the phase conductor S of the section 108. One end of the low-voltage winding 561 of the voltage transformer 551 is connected to earth, and the other end is connected through a line 565 to the right-hand terminal 566 of the reversing switch 153 and to the right-hand terminal 567 of the reversing switch 429.

The contact finger 568 of the reversing switch 153 is connected through a line 569 to the output 152 of the transmitter 129. The contact finger 570 of the reversing switch 429 is connected through a line 571 to the input 165 of the receiver 133. The drive 151 is used for switching the reversing 153 and 429 in dependence upon the energy direction in the event of an excess current, as has already been explained.

The high-voltage winding 572 of the voltage transformer 552 is connected through a line 573 to the phase conductor R of the section 108 and through a line 574 to the phase conductor S of the section 108.

One end of the low-voltage winding 575 of the voltage transformer 552 is connected to earth and the other end is connected through a line 576 to the left-hand terminal 577 of the reversing switch 164 and to the left-hand terminal 578 of the reversing switch 579.

The high-voltage winding 580 of the voltage transformer 553 is connected through a line 581 to the phase conductor R of the section 109 and through a line 582 to the phase conductor S of the section 109.

One end of the low-voltage winding 583 of the voltage transformer 553 is connected to earth and the other end is connected through a line 584 to the right-hand terminal 585 of the reversing switch 164 and to the right-hand terminal 586 of the reversing switch 579.

The contact finger 587 of the reversing switch 164 is connected through a line 588 to the output 163 of the transmitter 130. The contact finger 589 of the reversing switch 597 is connected through a line 590 to the input 154 of the receiver 134. The drive 162 is used for switching the reversing switches 164 and 579 in dependence upon the energy direction in the event of an excess current, as has already been explained.

The formation of the transmission channels required in the event of an excess current will now be explained with reference to three cases A, B and C. In all three cases, it is assumed (cf. FIG. 3) that the power line 100 is connected at both ends to energy sources 2* and 2** respectively. By virtue of the three-phase pickup of the excess current described earlier on (cf. FIG. 6), it does not matter which phase conductor or conductors of the power line is or are affected by a short circuit. The exact timing of the individual functions in the event of an excess current will be explained below with reference to FIGS. 15 and 16.

Case A

A short circuit has occurred in the selection 109. In this case, the energy direction prevailing during the excess current at points III and IV of the power line 100 will be from left to right. As described above, the drive 151 in the control means 113, in view of the fact that it is controlled by the associated directional relay 125, switches the contact finger 568 of the reversing switch 153 to the left-hand terminal 559 and switches the contact finger 570 of the reversing switch 429 to the right-hand terminal 567. In the same way, the drive 162 in the control means 114, in view of the fact that it is controlled by the associated directional relay 126, switches the contact finger 587 of the reversing switch 164 to the left-hand terminal 577 and switches the contact finger 589 of the reversing switch 579 to the right-hand terminal 586.

This results in the formation of the transmission channel 138 which leads from the output 152 of the transmitter 129 through the reversing switch 153, the line 558, the voltage transformer 550, the lines 555 and 556, to the phase conductors R and S of the section 107 and through this section 107 to the receiver 132 (cf. FIG. 2). However, this also results in the formation of the transmission channel 140 which leads from the output 163 of the transmitter 130 through the reversing switch 164, the line 576, the voltage transformer 552, the lines 573 and 574 to the phase conductors R and S of the section 108 and through this section 108 and the lines 562 and 563, the voltage transformer 551, the line 565, the reversing switch 429, to the input 165 of the receiver 133 (cf. FIG. 2).

In the aforementioned transmission channels 138 and 140, signal transmission takes place from right to left and, accordingly, complies with the requirement that it must be opposite to the energy direction in the event of an excess current.

As the short circuit affects the section 109, the transmission direction between points V and VI of the power line 100 is by contrast, from left to right because, in that case, the energy direction prevailing during the excess current is from right to left.

It follows from this that the fault-free sections 108 and 107 and, hence, 106 as well are used for signal transmission, as is section 110 between points V and VI. By contrast, the fault section 109 is not required or used for forming a transmission channel.

CASE B

A short circuit has occurred in the section 107. In this case, the energy direction prevailing during the excess current at points III and IV of the power line 100 is from right to left. As already mentioned, the drive 151 in the control means 113, in view of the fact that it is controlled by the associated directional relay 125, switches the contact finger 568 of the reversing switch 153 to the right-hand terminal 566 and switches the contact finger 570 of the reversing switch 429 to the left-hand terminal 560.

Similarly, the drive 162 in the control means 114, in view of the fact that it is controlled by the associated directional relay 126, switches the contact finger 587 of the reversing switch 164 to the right-hand terminal 585 and switches the contact finger 589 of the reversing switch 579 to the left-hand terminal 578.

This results in the formation of the transmission channel 141 which leads from the output 163 of the transmitter 130 through the reversing switch 164, the line 584, the voltage transformer 553, the lines 581 and 582, to the phase conductors R and S of the section 109 and, through the section 109, to the receiver 135 (cf. FIG. 2).

However, this also results in the formation of the transmission channel 139 which leads from the output 152 of the transmitter 129 through the reversing switch 153, the line 565, the voltage transformer 551, the lines 562 and 563, to the phase conductors R and S of the section 108 and, through this section 108 and the lines 573 and 547, the voltage transformer 552, the line 576, the reversing switch 579, to the input 154 of the receiver 134 (cf. FIG. 2).

In the aforementioned transmission channels 139 and 141, signal transmission takes place from left to right and, accordingly, complies with the requirement that it must be opposite to the energy direction prevailing during an excess current.

In view of the fact that the short circuit is in the section 107, the transmission direction between points I and II of the power line 100 is, by contrast, from right to left because, in that case, the energy direction prevailing during the excess current is from left to right.

It follows from this that the fault-free sections 108 and 109 and, hence, 110 as well are used for signal transmission as is the section 106 between points I and II. By contrast, the faulty section 107 is not required or used for forming a transmission channel.

CASE C

The short circuit has occurred in the section 108. In this case, the energy direction prevailing during the excess current at point III of the power line 100 is from left to right and, at point IV, from right to left. As already mentioned, the drive 151 in the control means 113, in view of the fact that it is controlled by the associated directional relay 125, switches the contact finger 568 of the reversing switch 153 to the left-hand terminal 559 and switches the contact finger 570 of the reversing switch 429 to the right-hand terminal 567.

Similarly, the drive 162 in the control means 114, in view of the fact that it is controlled by the associated directional relay 126, switches the contact finger 587 of the reversing switch 164 to the right-hand terminal 585 and switches the contact finger 589 of the reversing switch 579 to the left-hand terminal 578.

This results in the formation of the transmission channel 138 which leads from the output 152 of the transmitter 129 through the reversing switch 153, the line 558, the voltage transformer 550, the lines 555 and 556 to the phase conductors R and S of the section 107 and, through this section 107, to the receiver 132 (cf. FIG. 2).

However, this also results in the formation of the transmission channel 141 which leads from the output 163 of the transmitter 130 through the reversing switch 164, the line 584, the voltage transformer 553, the lines 581 and 582 to the phase conductors R and S of the section 109 and, through this section 109, to the receiver 135 (cf. also FIG. 2).

In the aforementioned transmission channel 138, signal transmission takes place from right to left and, accordingly, complies with the requirement that it must be opposite to the energy direction prevailing in the event of an excess current. In the transmission channel 141, signal transmission is from left to right and, accordingly, also complies with that requirement.

In view of the fact that the short circuit is in the section 108, the transmission direction between points I and II of the power line 100 is from right to left, because in that case the energy direction prevailing during excess current is from left to right. In contrast, in the section 108, the transmission direction between points V and VI of the power line 100 is from left to right, because in that case the energy direction prevailing during the excess current is from right to left. It follows from this that the fault-free sections 107 and 109 and 106 and 110 are used for signal transmission. By contrast, the faulty section 108 is not required or used for forming a transmission channel.

In the interests of completness, an embodiment of the timing element 209 (cf. FIG. 4, reference 209; FIG. 5, reference 224; FIG. 7, reference 351; FIG. 10, reference 209; FIG. 11, reference 224) will now be described with reference with FIG. 13.

Figure 13:
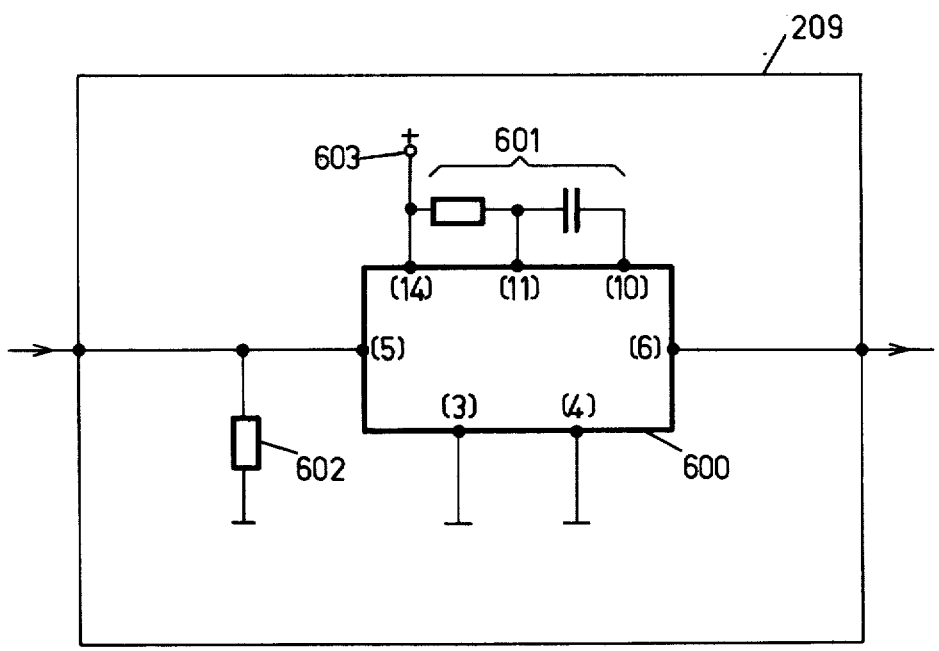
FIG. 13 shows one embodiment of a timing element.

The timing element 209 comprises a monostable multivibrator 600, for example a type SN74121 integrated circuit of the kind manufactured by Messrs. Texas Instruments Corp. U.S.A., with an RC-circuit 601. In FIG. 13, the terminals of the aforementioned integrated circuit are denoted by bracketed numbers. The terminal (5) is connected to earth through a resistor 602, whereas the terminal (14) is connected to the positive terminal 603 of a voltage source (not shown in FIG. 13).

Figure 14:
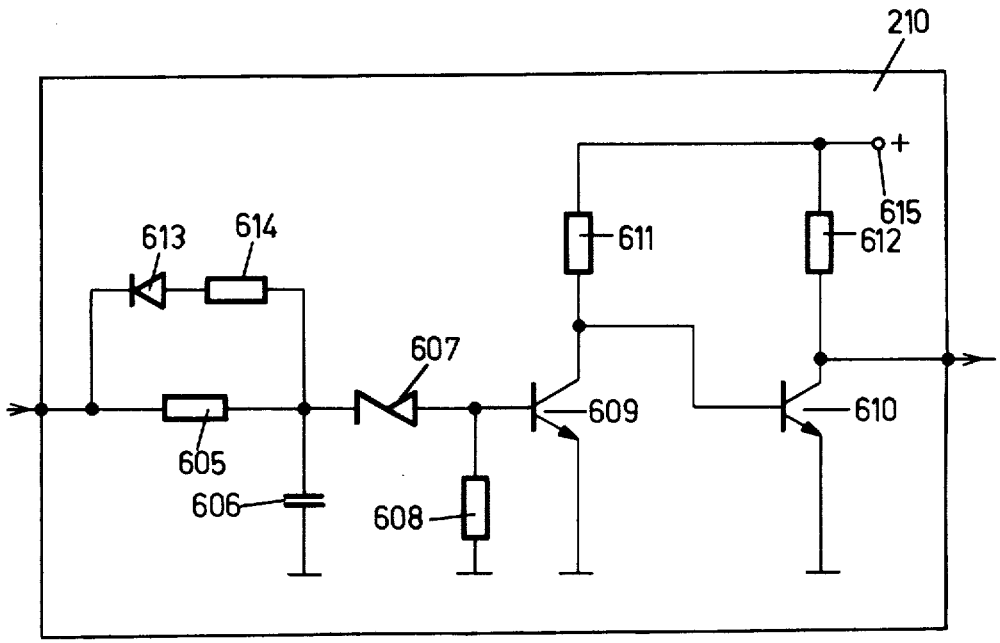
FIG. 14 shows one embodiment of a delay element.

FIG. 14 shows one embodiment of a delay element 210 (cf. FIG. 4, reference 210; FIG. 5, reference 225; FIG. 10, reference 210; FIG. 11, reference 225). The circuit illustrated in FIG. 4 comprises as its principal elements a so-called pseudo-integrator consisting of a resistor 605, a capacitor 606 followed by a level detector consisting of a Zener diode 607 and a resistor 608 and of an amplifier which comprises the transistors 609 and 610 and the resistors 611 and 612. A diode 613 and a resistor 614 are used for the rapid discharge of the capacitor 606, which is obtained by virtue of the fact that the resistor 614 is of a lower value than the resistor 605. The resistors 611 and 612 are connected to the positive terminal 615 of a voltage source (not shown in FIG. 14).

The timing of the switching operations in the event of an excess current will now be described with reference to the graphs in FIGS. 15 and 16 which relate respectively to a circuit breaker 8 or 8' and to an isolator 14 or 19 or 102 to 105.

Figure 15:
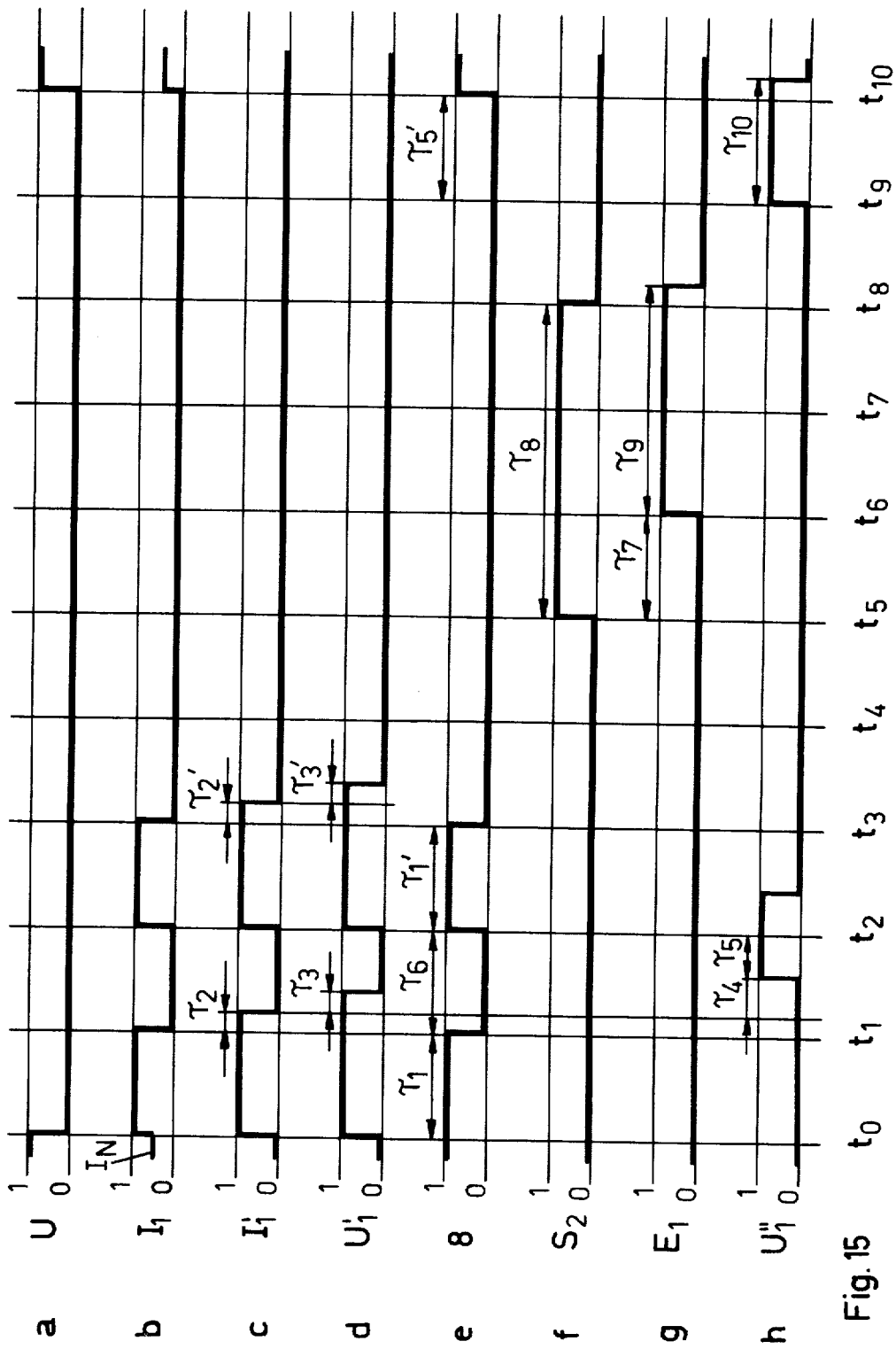
FIG. 15 shows diagrams of switching operations.

The graphs in FIG. 15 relate to the timing of events, for example in the case of the circuit breaker 8, for case C described above. It is assumed that the switch 8 is provided with an automatic reclose device of the kind described above with reference to FIG. 10.

Line *a* denotes the voltage U of the power line 100 as a function of time. The ordinate value 0 represents no voltage, whereas the ordinate value 1 represents normal voltage.

Line *b* represents the signal $I_1$ or of the current in the power line as a function of time (cf. FIG. 1).

Line *c* shows the signal $I_1'$ at the output of the monitoring means 31 (cf. FIG. 1) as a function of time, on this occasion however, in a power line of the kind illustrated in FIGS. 2 and 3.

Line $d$ shows the feed voltage $U_1'$ at the input 4 of the switch drive 208 (cf. FIG. 10) as a function of time.

Line $e$ shows the position of the switch 8 as a function of time, the ordinate value 0 representing the open position of the switch and the ordinate value 1 the closed position.

Line $f$ represents the signal $S_2$ at the input 60 of the receiver 54 as a function of time (cf. FIG. 1).

Line $g$ represents the signal $E_1$ at the output 62 of the receiver 54 (cf. FIG. 1) as a function of time.

Line $h$ represents the signal $U_1''$ at the input (3) of the switch drive 208 in FIG. 10 as a function of time.

In this connection, it will be recalled that the signal $U_1''$ (line $d$) represents the on command and the signal $U_1'$ (line $h$) the off command for the switch drive 208 in FIG. 10.

The graphs have not been drawn to scale, and individual response times have not been taken into consideration in the graph where they are of no significance to correct operation.

It will now be assumed that a short circuit occurs in the section 108 (according to case C) at time $t_0$. Accordingly, the voltage U in the power line 100 collapses, in other words line $a$ of the graph changes to the value 0. At the same time it is no longer the normal current $I_N$, but the excess current represented by the ordinate value 1 which flows through the power line, as indicated in line $b$. When normal current is flowing through the power line, the output signal $I_1'$ of the monitoring means 31 has the signal logic 0 whereas, from the time $t_0$ when the excess current begins to flow, it has the signal logic 1.

The slight delay in response by the inherent response time of the monitoring means 31 is not shown in line $c$ of the graph.

At time $t_0$, the feed voltage $U_1'$ (off command for the switch drive 208) changes from its original value 0 to the full voltage represented by the ordinate value 1. The response time of the preceding relay 204, which plays no part in this respect, has been left out of consideration.

The switch 8 is closed at time $t_0$; accordingly, line $e$ of the graph had the ordinate value 1 at time $t_0$.

At the end of a time interval $\tau_1$, i.e. the switch-off time of the circuit breaker 8, the circuit breaker is in its open position at time $t_1$, so that line $e$ of the graph assumes the ordinate value 0.

Opening of the switch 8 interrupts the flow of current through the power line, so that line $b$ of the graph assumes the ordinate value 0. At the end of the holding period $\tau_2$ of the corresponding relay 319, 320 or 321 (cf. FIG. 6), the signal $I_1'$ also assumes the ordinate value 0 (see line $c$ of the graph).

After another holding period $\tau_3$ of the relay 204 (cf. FIG. 10), the signal $U_1'$ assumes the value 0 cf. graph $d$.

After a delay $\tau_4$ after the disappearance of the output signal $I_1'$ of the monitoring means 31 (cf. line $c$), the automatic reclose command appears at the input 3 of the switch drive 208 (cf. FIG. 10). Accordingly, line $h$ of the graph changes from the ordinate value 0 to the value 1 at the end of the aforementioned delay period $\tau_4$.

At the end of the switch-on period $\tau_5$, the circuit breaker 8 closes at time $t_2$, cf. line $e$ of the graph. Accordingly, a rest period $\tau_6$ exists between the time $t_1$ at which the switch 8 is switched on for the first time and the time $t_2$ when the switch 8 is automatically closed.

The short-circuit in question is a permanent short circuit so that when the switch 8 is closed at time $t_2$ the excess current immediately begins to flow again in the power line 100. Accordingly, line $b$ of the graph re-assumes the value 1 at time $t_2$. The same applies as regards the signal $I_1'$, cf. line $c$ of the graph. Accordingly, the voltage $U_1'$ re-assumes the ordinate value 1 at time $t_2$. The result of this is that after its off time $\tau_1'$ the circuit breaker 8 opens again at time $t_3$.

Steps have to be taken, by providing interlocking circuits known per se to ensure that the on command $U_1''$, according to line $h$, which is still persisting as well is neutralised as from time $t_2$.

When the switch 8 opens at time $t_3$, the current in the power line returns to 0, so that line $b$ of the graph re-assumes the value 0 as from time $t_3$.

After the holding period $\tau_2'$, the signal $I_1'$, line $c$ of the graph, also returns to the value 0. The voltage $U_1'$ also returns to 0, cf. line $d$, after the holding period $\tau_3'$ following disappearance of the signal $I_1'$.

Accordingly, the circuit breaker 8 is opened and remains open.

As already mentioned, the signal $S_2$ is transmitted to the receiver 54 of the circuit breaker 8 from an adjacent switch in the power line 100. In the present case (FIG. 2) the switch in question is the switch 102, or from the transmitter 128 associated with that switch, after opening of the switch 102, i.e., as from time $t_5$ cf. line $f$ of the graph.

Accordingly, the receiver 54 forms the signal $E_1$ at its output 62, cf. line $g$ of the graph. The signal $E_1$ only appears after a charging time $\tau_7$ of the RC-section 410 of the receiver 54 (cf. FIG. 8).

During that period $\tau_9$, the signal $E_1$ appears at the output of the receiver because, following disappearance of the transmitting signal $S_2$ (line $f$ of the graph), the capacitor in the RC-section 410 still has to discharge.

Figure 7:
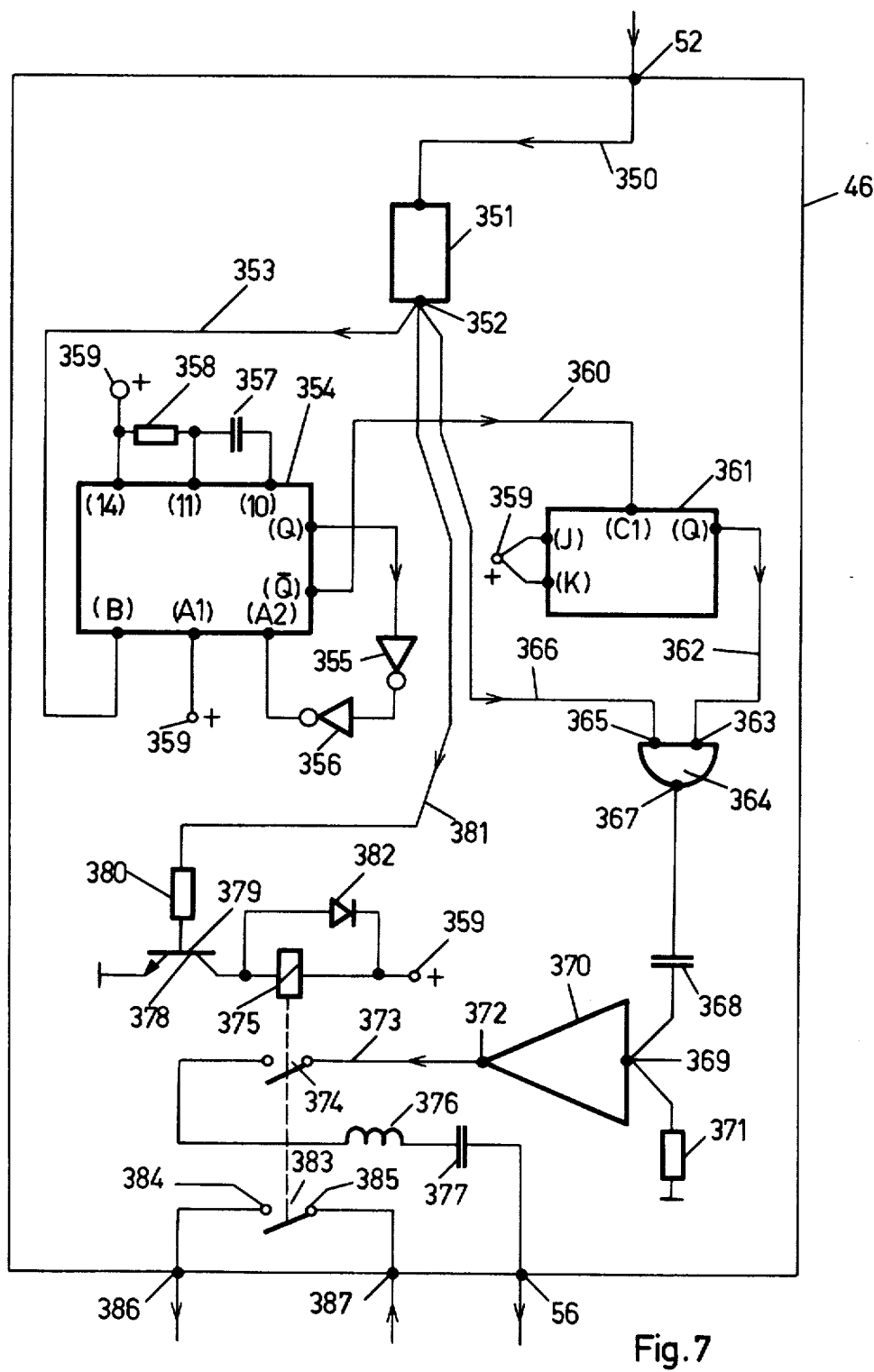
FIG. 7 shows one embodiment of a transmitter.

The period for which the transmitting signal $S_2$ appears is $\tau_8$ and is determined by the timing element 351 (cf. FIG. 7).

As a result of the signal $E_1$, line $g$ of the graph, the voltage $U_1''$ only appears at the input 3 of the switch drive 208 for a period of $\tau_{10}$ as from time $t_9$ on account of the timing element 209 and delay element 210 present in the switch-operating means (cf. FIG. 10). This voltage $U_1''$ forms the on command for the switch drive 208.

Accordingly, the circuit breaker 8 closes again after its on time $\tau_5'$, cf. line $e$ of the graph, time $t_{10}$, so that the voltage U of the power line 100, cf. line $a$ of the graph, reappears at time $t_{10}$, and the normal current $I_N$, cf. line $b$ of the graph flows again in the power line cleared of the faulty section 108.

Figure 16:
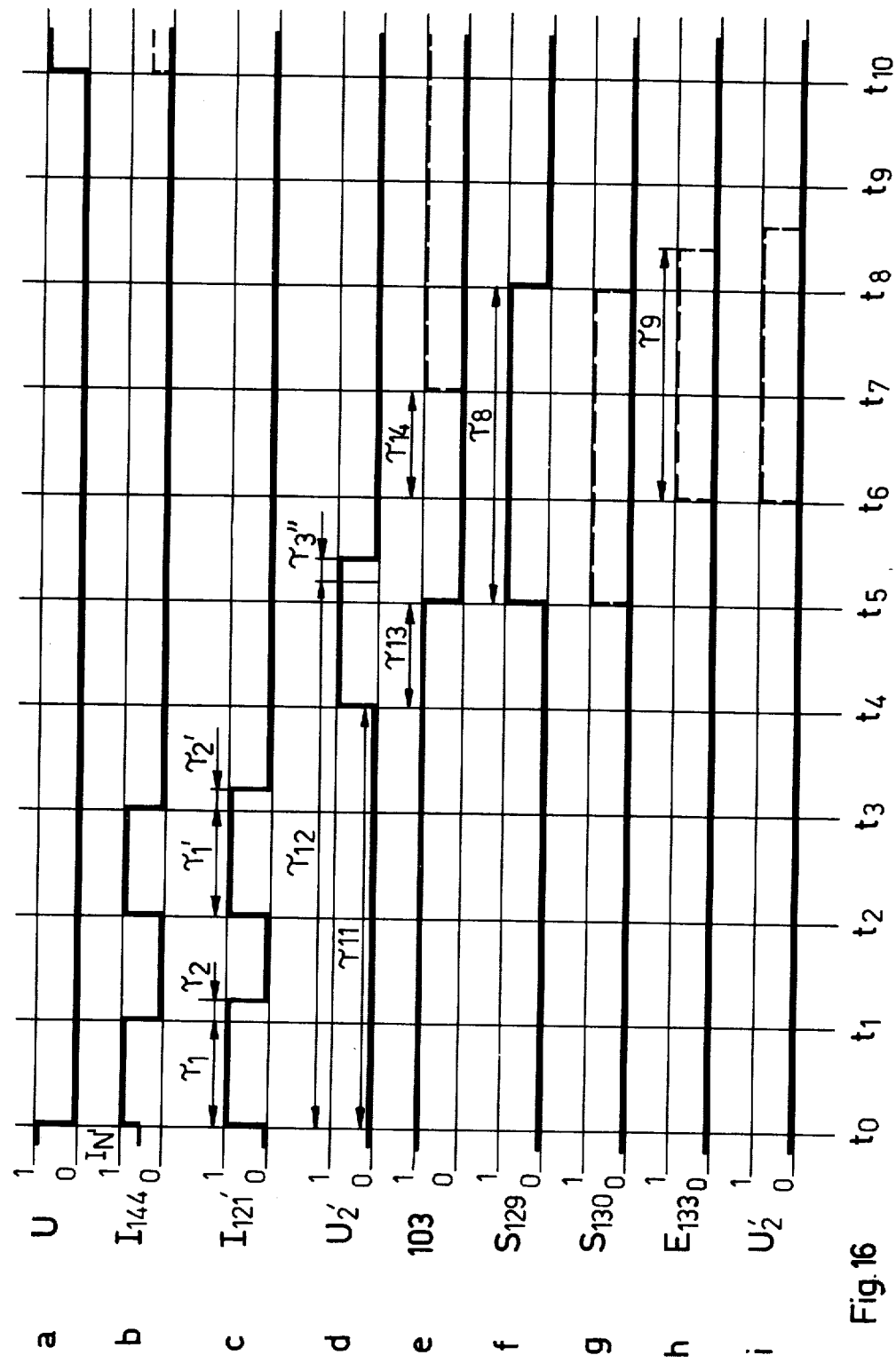
FIG. 16 shows further diagrams of switching operations.

The graphs in FIG. 16 relate to the timing of events, for example in the case of an isolator 103, for the case C described earlier on. It is assumed that the switch 103 has to be operated substantially free from current, as has already been explained with reference to FIG. 11.

Line $a$ represents the voltage U of the power line as a function of time. The ordinate value 0 represents no voltage, whereas the ordinate value 1 represents normal voltage.

Line $b$ represents as a function of time the current $I_{144}$ on the secondary side of the current transformer 144 (cf. FIG. 3).

Line c represents the signal $I_{121}'$ at the output 327 on the monitoring means 121 (cf. FIG. 6) as a function of time, on this occasion however in a power line of the kind shown in FIGS. 2 and 3.

Line d represents the feed voltage $U_2'$ at the input (0) of the switch drive 235 (cf. FIG. 11) as a function of time.

Line e represents the position of the switch 103 as a function of time, the ordinate value 0 representing the open position and the ordinate value 1 the closed position of the switch.

Line f represents the signal $S_{129}$ at the output 152 of the transmitter 129 (cf. FIG. 3) as a function of time.

Line g represents the signal $S_{130}$ at the output 163 of the transmitter 130 (cf. FIG. 3) as a function of time.

Line h represents the signal $E_{133}$ at the output 173 of the receiver 133 in FIG. 3 as a function of time.

Line i represents the signal $U_2''$ at the input (I) of the switch drive 235 (cf. FIG. 11) as a function of time.

In this connection, it will be recalled that the signal $U_2'$ (line d) represents the on command and the signal $U_2''$ (line i) the off command for the switch drive 235 in FIG. 11.

In connection with the aforementioned graphs, it is pointed out that the times drawn in have not been drawn to scale and that, in the interests of clarity, individual response times have not been taken into consideration in the graph where they are of no significance to correct operation.

It will now be assumed that a short circuit occurs in the section 108 (according to Case C) at time $t_0$. Accordingly, the voltage U in the power line 100 collapses, in other words line a of the graph changes the value 0. At the same time, it is no longer the normal current $I_N'$, but the excess current represented by the ordinate value 1 which flows through the power line, as indicated in line b. When normal current is flowing through the power line, the output signal $I_{121}'$ of the monitoring means 121 has the signal logic 0, whereas from time $t_0$, when the excess current begins to flow, it has the signal logic 1.

The slight delay in response attributable to the inherent response time of the monitoring means 121 is not shown in line c of the graph.

Due to the presence of the delay element 225, the voltage $U_2'$ only appears at the input (0) of the switch drive 235 (cf. FIG. 11) at the end of the delay time $\tau_{11}$ of the delay element 225, i.e. from time $t_4$. The voltage $U_2'$ appears at the input (0) of the switch drive 235 up to the end of the duty period $\tau_{12}$ of the timing element 224 plus the drop-out delay $\tau_3''$ of the relay 231 (cf. FIG. 11).

As can be seen from line b of the graph, the excess current was interrupted at time $t_1$ through opening of the preceding circuit breaker 8. Following automatic fast reclosure of the circuit breaker at time $t_2$, the excess current reappears up to time $t_3$, at which the circuit breaker 8 is definitively opened. The signal $I_{121}'$ indicating the excess current appears for the first time from $t_0$ for the duration $\tau_1 + \tau_2$ (cf. line c in FIGS. 15 and 16) and again from $t_2$ for the duration $\tau_1' + \tau_2'$.

Due to the delayed response of the switch drive 235 (cf. FIG. 16, line d), the reappearance of the excess current from $t_2$ to $t_3$ does not have any effect upon the voltage $U_2'$ (off command for the switch drive 235) as a function of time.

In cases where automatic fast reclosure at time $t_2$ is successful, i.e., in cases where the short circuit detected at time $t_0$ has meanwhile disappeared, the phase voltages re-appear on the secondary side of the voltage transformer 147 (cf. FIG. 9), so that the output 227 of the AND-gate 223' is blocked in the switch-operating means 23* (cf. FIG. 11) of the switch 103. Accordingly, the switch 103 does not respond to the temporary short circuit.

However, if the short circuit is still in evidence at time $t_2$, the switch 103 is opened at time $t_5$ at the end of its off time $\tau_{13}$ due to the appearance of the voltage $U_2'$ (cf. FIG. 16, line d). This is illustrated in line e of the graph by the condition 0 at time $t_5$.

Accordingly, the switch 103 is opened and remains open.

As already mentioned, the signal $S_{129}$ (cf. FIG. 16, line f) is transmitted from time $t_5$ by the transmitter 129 associated with the switch 103 for a period $\tau_6$, passing through the transmission channel 138 (cf. FIG. 2) to the receiver 132 of the switch 102.

In the meantime, the switch 102 has also been opened in the same way as the switch 103. Due to reception of the transmitted signal $S_{129}$ by the receiver 132 of the switch 102, the switch 102 is closed. Accordingly, the section 107 of the power line is reconnected to the preceding section 106. Since it was assumed in case C that the short circuit was occurred in section 108, this section 108 should firstly remain separated from the power line 100 and secondly should not be used as a transmission channel for signals. As explained earlier on, no transmitted signal from an adjacent switch passes to the receiver 133 associated with the switch 103.

Accordingly, the transmitter 130 of the adjacent switch 104 (cf. FIGS. 2 and 3) does not transmit any signal $S_{130}$ to the receiver 133 of the switch 103. Accordingly, line g of the graph (solid line) remains at the value 0, and no signal $E_{133}$ appears at the output 173 of the receiver 133 (cf. line h of the graph). Neither does any voltage $U_2''$ appear as on command at the switch drive 235 either (cf. FIG. 11, line e of the graph). As already mentioned, a signal $S_2$ is transmitted from the transmitter 128 of the switch 102 to the receiver 54 of the circuit breaker 8. Through a timing element 209 and a delay element 210 in the switch-operating means 22 and 22* (cf. FIG. 10), the signal E subsequently emitted from the receiver 54 to the switch-operating means of the circuit breaker 8 to close from time $t_{10}$.

The period from $t_6$ i.e., when the receiver signal $E_1$ appears (cf. FIG. 15, line g, time $t_6$) to $t_9$, i.e. when the on command $U_1''$ appears (cf. FIG. 15, line h, time $t_9$) is longer than the longest closure time of the switches 102 to 105 encountered in practice. The object of this is to ensure that the circuit breaker 8 is only closed following actuation of the switches 102 to 105 which are in the form of isolators.

The on time $\tau_5'$ of the circuit breaker 8 is in the period from $t_9$ (cf. FIG. 15, line h) to $t_{10}$. The circuit breaker 8 is closed again from time $t_{10}$, and the voltage U of the power line 100 re-appears in the connected, fault-free sections 106 and 107 (cf. FIG. 16, line a, time $t_{10}$).

Since the power line 100 according to FIG. 2 is also supplied with energy from the right, a short circuit in the section 108 at time $t_0$ is accompanied by an excess current in the power line 100 to the right of the section 108. Naturally, the energy direction prevailing in the event of this excess current in the sections to the right of the section 108 is from right to left.

Since, like the aforementioned switches 102 and 103 and 8, the switches 104 and 105 and 8' situated to the right of the section 108 affected by the short circuit are provided with control means 114 and 115 and 101' which are identical with the control means 112, 113 and 101, the faulty section 108 is also automatically isolated from that part of the power line 100 leading to the right-hand energy source 2*.

The circumstances prevailing in a power line according to FIG. 2 in case A above will now be briefly described. Since, in this case, the section 108 is not a faulty section, it forms part of a transmission channel from the transmitter 130 of the switch 104 to the receiver 133 of the switch 103 (cf. FIG. 2). On the other hand, the section 109 does not form any part of such a transmission channel in this case. Accordingly, no signal is transmisted from the transmitter 131 of the switch 105, after it has opened, to the receiver 134 of the switch 104. Accordingly, this switch 104 does not contain any on command, so that the switch 104 remains open and the faulty section 109 remains isolated, as seen from the direction of the energy source 2*.

By contrast, the transmitter 130 of the switch 104 emits a signal $S_{130}$ which is transmitted along the fault-free section 108 to the receiver 133 of the switch 103. Accordingly, the switch 103 closes, so that the section 108 is also placed under voltage again, together with the other sections 107 and 106, by the circuit breaker 8.

In FIG. 16, line g, the signal $S_{130}$ transmitted from the transmitter 130 in the event of a short circuit in the section 109 in case A described above, is represented in chain lines by the ordinate value 1 occurring from time $t_5$. The duration of this signal is also $\tau_8$, as was previously the case in line $f$ of the graph in respect of the transmitter signal $S_{129}$. The receiver signal $E_{133}$ formed as a result at the output 173 of the receiver 133 is shown in chain lines in line $h$. It begins at time $t_6$ (as in FIG. 15, line g) and lasts for the period $\tau_9$. As a result of the receiver signal $E_{133}$, the on command $U_2''$ of the switch drive 234 is formed without delay (cf. FIG. 11). In this case, the switch 103 would assume its closed position at time $t_7$ after the on time $\tau_{14}$, which is shown in FIG. 16, chain-line $e$. As before, the circuit breaker 8 will close again at time $t_{10}$.

In the above examples it has been assumed, although not shown in the corresponding Figures, that energy consumers or power lines to energy consumers are connected to the power lines 10 and 11 in the individual sections. Accordingly, the normal current $I_N$ for example is not equal in intensity over the entire length of the power line, but always weaker than the excess current. Naturally, in the event of isolation of a faulty section, the power lines or the energy consumers connected to that faulty section remain without energy supply until they are reconnected following elimination of the short circuit.

Where the present invention is applied to a branched mains, i.e., to mains with branches leading off laterally from the power line 10 or 100, any faulty section present in a branch is automatically isolated in the same way as described above, naturally on condition that the corresponding switches in the branches are equipped with identical control means. In this case, it is possible for transmission channels for the corresponding transmitter signals to fork open, so that, as a result of a certain transmitter signal, more than one switch is closed or, in the absence of such a transmitter signal, more than one switch remains in its open position. This represents another advantage of the invention and is also the reason why changes in the mains configuration do not necessitate any changes in the control means already present in existing switches.

Reference is now made to one particularly advantageous embodiment of the invention. In the description of FIG. 8 which shows a receiver 55, it was pointed out that the line 404 leads to the RC-section 410 through the terminal 405, the line 406, the terminal 387 of the transmitter 46, the switching contact 383 in the transmitter 46, the terminal 386 of the transmitter 46, the line 407, the input terminal 408 and the line 409. The transmitter 46 is such that the switching contact 383 is only closed during the transmission time of the transmitter 46, i.e. even when an adjacent transmitter, for example the transmitter 47, transmits a signal, so that the receiver 55 arranged in the transmitter 46 has to be ready to receive. In the interests of immunity from interference, it is of advantage to keep the receiver 55 ready to receive during this transmission time only and to block it for the rest of the time. The switching contact 383 is used for this purpose.

Accordingly, at points I and VI of the power line 100, i.e. at the circuit breaker(s) 8 and 8', the associated receiver can only be made ready to receive for the necessary period. However, since there is normally no transmitter at points I and VI, the aforementioned switching contact 383 (cf. FIG. 7) is not available there. Instead, a switching contact can be actuated in the same way as shown in FIG. 7 by means of a timing element 351 and a relay 375. In this case, too, the input signal for the timing element 351 emanates from an auxiliary contact provided in the switch drive (cf. FIG. 5, switching contact 244).

A power line 100 also can be part of an intermeshed network. If, in this case, the power line 100 is situated between two nodes of an intermeshed network, these nodes can be regarded as energy sources. In this case, the switches 8 and 8' at the nodes also have to be provided with a directional relay and with a transmitter. As can be seen from the foregoing, this is necessary because, depending upon the position of any short circuit occurring, signals also have to be emitted from switches adjacent to those switches, in order to isolate a faulty section in the required manner. In the interests of completeness, it is pointed out that, if the arrangement according to the invention is to work properly, it is of course necessary to provide the requisite energy supply. Since the arrangement according to the invention has to function properly, especially during disturbances, corresponding energy stores have to be provided for operating the arrangement according to the invention. In the case of switch drives, it is possible to provide, for example, mechanical or pneumatic power stores of known type. So far as the various electronic and electrical components of the arrangement are concerned, it is convenient to use, for example, an accumulator or storage battery normally buffered from the power supply system. One example of a node of the power line 100 will now be described further with reference to FIGS. 17 and 18. It is assumed that this node is situated at point III of the power line 100. The branch is illustrated diagramatically in FIG. 17. The section 107 of the power line 100 leads through a switch 103A to a busbar 700. Another switch 103B leads to the section 108 of the power line 100. Control means 113A and 113B are associated with the switches 103A and 103B.

A line 705 branches off from the busbar 700 through a switch 103C. A control means 113C is also associated with the switch 103C.

Since control means for the switches have already been described in detail with reference to previous embodiments, they are only indicated in FIGS. 17 and 18. The switches 103A, 103B and 103C are all arranged at the same place, so that this embodiment affords the advantage that there is no need to provide a separate transmitter in each of the three aforementioned switches; instead it is sufficient to provide one transmitter for all three switches. This common transmitter will occasionally be assigned to a certain switch to transmit a signal to an adjacent switch in the power line or, in some cases, to an adjacent switch in the line 705.

The transmitter associated with the branch at point III is connected to the busbar 700, and the requisite transmission channels to adjacent switches are formed by the corresponding position of the switches 103A, 103B and 103C in the same way as explained above.

In contrast to previously described examples, it is not only the appearance of the excess current which is used as criterion for the opening of a switch, the energy direction prevailing during the appearance of the excess current is also taken into consideration as a criterion for opening of the switch. The arrangement is such that, in the event of an excess current flowing through a certain switch, this switch is only opened when the energy direction through it during the excess current is directed away from the busbar 700. In this case, therefore, the excess current flows either to the section 107 or to the section 108 or to the line 705.

The particular measures which have to be taken when the invention is applied to a node will now be described with reference to the somewhat more detailed FIG. 18. In the interests of clarity, only those components affected by the particular measures referred to have been shown in FIG. 18.

The switch 103A has associated with it a control means 113A with a directional relay 125A, a monitoring means 121A, a switch-operating means 117A, a receiver 133A and a voltage transformer 706A. A line 707A leads from an output 327A of the monitoring means 121A to the terminal (19) of the directional relay 125A, whereas a line 708A leads from the terminal (20) of the directional relay 125A to an input 709A of the switch-operating means 117A. An output 710A of the switch-operating means 117A is connected through a line 711A to an input 712A of the transmitter 129* common to all three switches.

The control means 113B and 113C are similar to control means 113A.

The switch 103B has associated with it the control means 113B with a directional relay 125B, a monitoring means 121B, a switch-operating means 117B, a receiver 133B and voltage transformer 706B.

A line 707B leads from an output 327B of the monitoring means 121B to the terminal (19) of the directional relay 125B, whereas a line 708B leads from the terminal (20) of the directional relay 125B to an input 709B of the switch-operating means 117B. An output 710B of the switch-operating means 117B is connected through a line 711B to the input 712 of the common transmitter 129*.

The switch 103C has associated with it the control means 113C with a directional relay 125C, a monitoring means 121C, a switch-operating means 117C, a receiver 133C and a voltage transformer 706C.

A line 707C leads from an output 327C of the monitoring means 121C to the terminal (19) of the directional relay 125C, whilst a line 708C leads from the terminal (20) of the directional relay 125C to an input 709C of the switch-operating means 117C. An output 710C of the switch-operating means 117C is connected through a line 711C to the input 712 of the common transmitter 129*.

The common transmitter 129* is designed in basically the same way as the transmitter 46 described earlier on with reference to FIG. 7, the basic difference being that, instead of only one contact 383, there are three contacts 383A, 383B, 383C. As already described, the three contacts 383A, 383B and 383C are used to make the receivers 133A, 133B and 133C ready to receive only during the transmission time of the common transmitter 129*. To this end, they are connected through the line 713A, 713B and 713C to the receivers 133A, 133B and 133C.

The output 714 of the transmitter 129* is connected through a line 715 and a voltage transformer 716 to the phase R and S of the busbar 700. Depending on whether the switch 103A, 103B or 103C is closed, a transmission channel leads from the output 714 of the transmitter 129* to the section 107 or 108 or to the line 705.

One such transmission channel leads through each of the lines 717A and 718A, 717B and 718B, 717C and 718C and through each of the voltage transformers 706A, 706B and 706C to the inputs 165A, 165B, 165C of the receivers 133A, 133B and 133C.

The outputs 173A, 173B and 173C of the receivers 133A, 133B and 133C are connected through lines 175A, 175B and 175C to the inputs 177A, 177B and 177C of the associated switch-operating means 117A, 117B and 117C.

Manually operable switches 719A, 719B and 719C are advantageously built into the lines 175A, 175B and 175C, in order to block the line, for example in the event of inspection work at point III or on lines or sections adjacent that point, including the associated switches.

Figure 17:
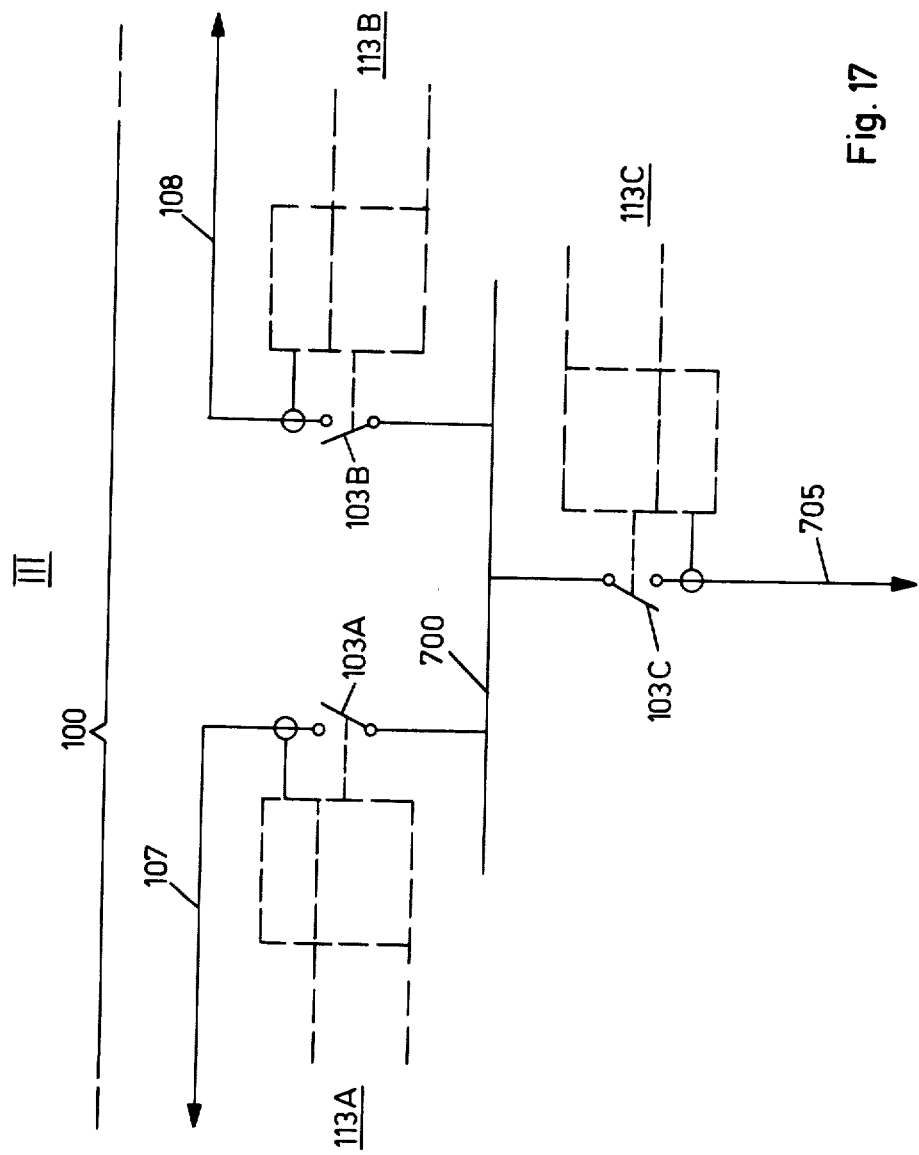
FIG. 17 is a basic diagram of one embodiment of the invention for a junction of an energy supply network.
Figure 18:
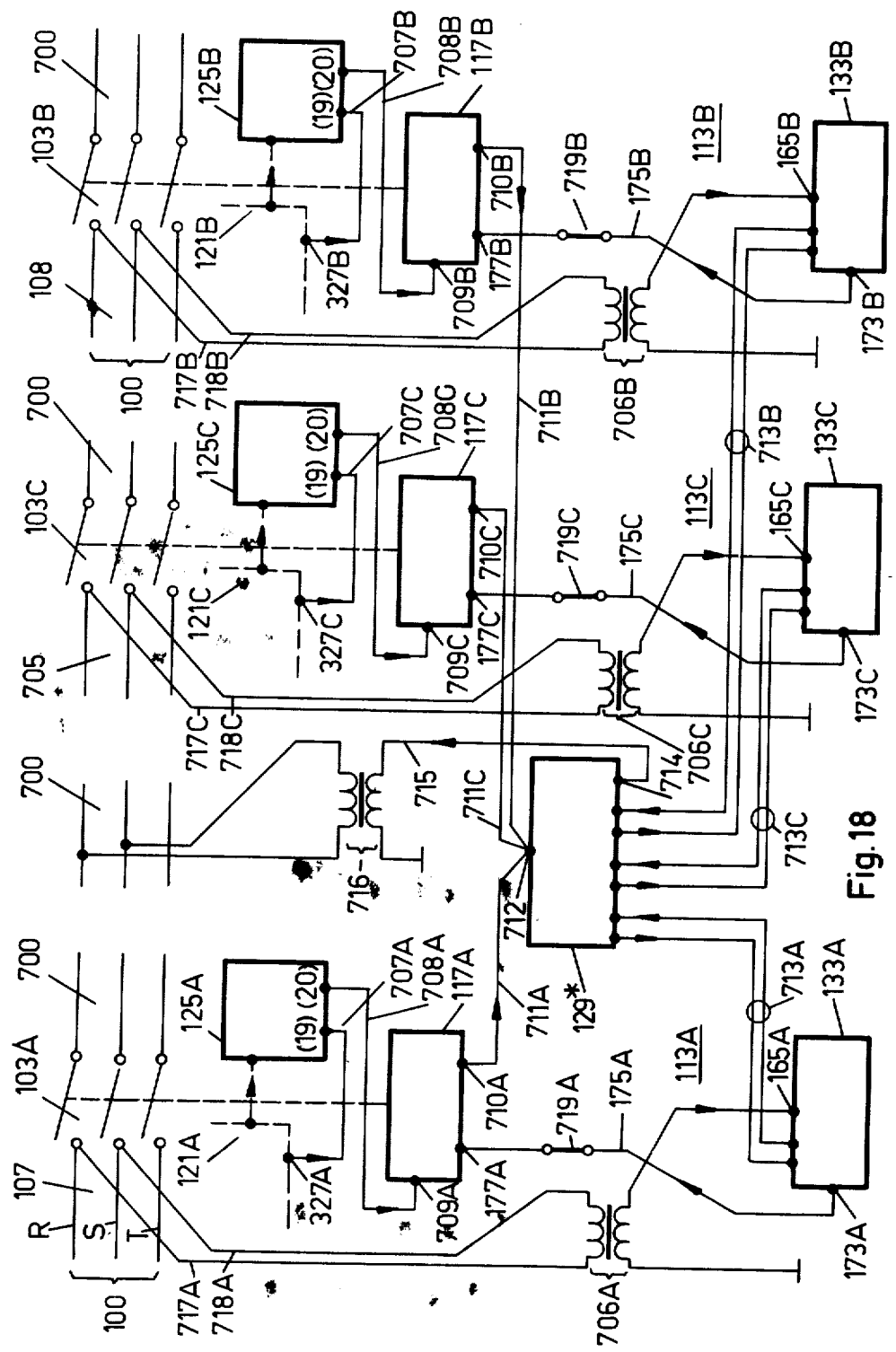
FIG. 18 is a more detailed circuit diagram of the embodiment illustrated in FIG. 17.

It can readily be seen from what was said above in connection with cases A, B and C that in the case of the junction illustrated in FIGS. 17 and 18, a faulty section is automatically switched off in the same way, and the fault-free sections automatically reconnected to the energy source or energy sources.

If no other switch with a control means of the kind described above is present in the line 705, no receiver 133C and, hence, no voltage transformer 706C either, is required in the control means 113C of the switch 103C, as illustrated in FIG. 1 in regard to the switch 19.

If the line 705 can only be supplied with energy from the busbar 700, the output 327C in the control means 113C of the switch 103C can be directly connected to the input 709C (cf. FIG. 18), and the directional relay 125C can be omitted.

While there is shown and described present preferred embodiments of the invention it is to be distinctly understood that the invention is not limited thereto but may be otherwise variously embodied and precticed within the scope of the following claims. Accordingly,

What is claimed is:

1. A method of automatically isolating a faulty section of a power line of an electrical supply network, the power line being adapted to be connected to at least one energy source and to be temporarily divided up into sections by switches following the appearance of an excess current, and automatically reconnecting normally operating sections of the power line to said at least one energy source, the improvement comprising the steps of transmitting a signal from the location of at least one switch, when said one switch is open, which has automatically opened after an excess current has passed through it through a non-faulty part of the power line to at least one other switch through which at least a part of the excess current had passed to the now opened said one switch, and which other switch has also automatically opened, reception of the aforementioned signal being an essential requirement for closing said other switch.

2. The method as claimed in claim 1, including the step of additionally utilizing the absence of an excess current as criterion for the automatic operation of a switch.

3. The method as claimed in claim 2, wherein the absence of voltage in the power line is additionally used as criterion for the automatic operation of a switch.

4. The method as claimed in claim 1, including the step of connecting the power line to the energy source on the automatic reclose principle.

5. A method of automatically isolating a faulty section of a power line of an electrical supply network, the power line being adapted to be connected to at least one energy source and to be temporarily divided up into sections by switches following the appearance of an excess current, and automatically reconnecting normally operating sections of the power line to said at least one energy source, the improvement comprising the steps of transmitting a signal from the location of at least one switch which has automatically opened after an excess current has passed through it through a non-faulty part of the power line to at least one other switch through which at least a part of the excess current had passed to the now opened switch, and which other switch has also automatically opened, reception of the aforementioned signal being an essential requirement for closing said other switch, and using as another criterion for the automatic operation of a switch the energy direction through that switch in the event of an excess current.

6. A method of automatically isolating a faulty section of a power line of an electrical supply network, the power line being adapted to be connected to at least one energy source and to be temporarily divided up into sections by switches following the appearance of an excess current, and automatically reconnecting normally operating sections of the power line to said at least one energy source, the improvement comprising the steps of transmitting a signal from the location of at least one switch which has automatically opened after an excess current has passed through it through a non-faulty part of the power line to at least one other switch through which at least a part of the excess current had passed to the now opened switch, and which other switch has also automatically opened, reception of the aforementioned signal being an essential requirement for closing said other switch, and wherein in intermeshed or branched energy supply network, said signal is delivered both to at least one switch in the power line itself and to at least one switch in a branch line.

7. A method of automatically isolating a faulty section of a power line of an electrical supply network, the power line being adapted to be connected to at least one energy source and to be temporarily divided up into sections by switches following the appearance of an excess current, and automatically reconnecting normally operating sections of the power line to said at least one energy source, the improvement comprising the steps of transmitting a signal from the location of at least one switch which has automatically opened after an excess current has passed through it through a non-faulty part of the power line to at least one other switch through which at least a part of the excess current had passed to the now opened switch, and which other switch has also automatically opened, reception of the aforementioned signal being an essential requirement for closing said other switch, and wherein the power line is connectible only to one energy source so that the energy direction, in the event of an excess current, is always the same, and the transmission direction for the aforementioned signal is also always the same and specifically opposite to said energy direction.

8. A method of automatically isolating a faulty section of a power line of an electrical supply network, the power line being adapted to be connected to at least one energy source and to be temporarily divided up into sections by switches following the appearance of an excess current, and automatically reconnecting normally operating sections of the power line to said at least one energy source, the improvement comprising the steps of transmitting a signal from the location of at least one switch which has automatically opened after an excess current has passed through it through a non-faulty part of the power line to at least one other switch through which at least a part of the excess current had passed to the now opened switch, and which other switch has also automatically opened, reception of the aforementioned signal being an essential requirement for closing said other switch, and wherein the power line is connectible to more than one energy source, and determining the energy direction in the event of an excess current in the sections of the power line in order to control the required transmission direction of the aforementioned signal.

9. An arrangement for automatically isolating a faulty section of a power line of an electrical supply network wherein the power line of the electrical energy supply network is adapted to be connected to at least one energy source by means of a first switch and divided into individual sections by further switches, a switch-operating means associated with each of said switches, each of said switch-operating means being controllable at the particular switch by a monitoring means operatively associated with it and its associated switch, in dependence on the current in the power line, a transmitter controllable in dependence upon the response of the monitoring means associated with each one of at least a certain number of the switches, a receiver associated with each one of at least a certain number of the switches, the receiver being connected through a control connection to the switch-operating means associated with its associated switch, each transmitter having an output, the output of each transmitter associated with a certain switch being adapted for connection through a transmission channel containing a non-faulty part of the power line to an input of a receiver associated with another switch adjacent to that switch in the power line, the signal transmission in said transmission channel being directed opposite to the direction of energy flow in the power line throughout the duration of an excess current in order to control the switch associated with the receiver in dependence upon a signal transmitted in the event of an excess current.

10. The arrangement as claimed in claim 9, wherein switches provided for connecting the power line to an energy source are equipped with an automatic reclose device.

11. The arrangement as claimed in claim 9, wherein the power line has a branch, a busbar on both sides of the branch being connected through switches to adjacent sections of the power line, the branch being designed to be connected to said busbar through another switch, and wherein the output signal of the associated monitoring means is delivered through a contact actuated in dependence upon the energy direction in the event of an excess current in the associated directional relay and through a line to an input of the associated switch-operating means.

12. The arrangement as claimed in claim 9, wherein the power line can only be connected to one energy source through a switch, fixed transmission channels being associated with transmitters of switches in the power line between a transmitter and the receiver associated with an adjacent switch.

13. The arrangement as claimed in claim 9, wherein the power line can be connected to more that one energy source through switches, the transmission channel of a transmitter to the reciever of an adjacent switch being reversible from case to case in dependence upon the energy direction prevailing during the excess current detected by a directional relay associated with the corresponding switch.

14. An arrangement for automatically isolating a faulty section of a power line of an electrical supply network wherein the power line of the electrical energy supply network is adapted to be connected to at least one energy source by means of a first switch and divided into individual sections by further switches, a switch-operating means associated with each of said switches, each of said switch-operating means being controllable at the particular switch by a monitoring means operatively associated with it and its associated switch, in dependence on the current in the power line, a transmitter controllable in dependence upon the response of the monitoring means associated with each one of at least a certain number of the switches, a receiver associated with each one of at least a certain number of the switches, the receiver being connected through a control connection to the switch-operating means associated with its associated switch, each transmitter having an output, the output of each transmitter associated with a certain switch being adapted for connection through a transmission channel containing a non-faulty part of the power line to an input of a receiver associated with another switch adjacent to that switch in the power line, the signal transmission in said transmission channel being directed opposite to the direction of energy flow in the power line throughout the duration of an excess current in order to control the switch associated with the receiver in dependence upon a signal transmitted in the event of an excess current, and wherein in the switch-operating means a first path leads from an input at which a signal indicating the excess current is delivered to it, through a timing element and a delay element to a first input, a second path leads through an inverter to a second input of an AND-gate having an output which leads to a transistor whose collector circuit incorporates a relay through a normally-open contact of which a feed voltage is applied from a terminal to the terminal of a switch drive responsible for switching off the switch.

15. An arrangement for automatically isolating a faulty section of a power line of an electrical supply network wherein the power line of the electrical energy supply network is adapted to be connected to at least one energy source by means of a first switch and divided into individual sections by further switches, a switch-operating means associated with each of said switches, each of said switch-operating means being controllable at the particular switch by a monitoring means operatively associated with it and its associated switch, in dependence on the current in the power line, a transmitter controllable in dependence upon the response of the monitoring means associated with each one of at least a certain number of the switches, a receiver associated with each one of at least a certain number of the switches, the receiver being connected through a control connection to the switch-operating means associated with its associated switch, each transmitter having an output, the output of each transmitter associated with a certain switch being adapted for connection through a transmission channel containing a non-faulty part of the power line to an input of a receiver associated with another switch adjacent to that switch in the power line, the signal transmission in said transmission channel being directed opposite to the direction of energy flow in the power line throughout the duration of an excess current in order to control the switch associated with the receiver in dependence upon a signal transmitted in the event of an excess current, and wherein the switch-operating means a first path leads from an input, at which a signal indicating the excess current is delivered to it, through a timing element and a delay element to a first input, and a second path leads through an inverter to a second input of and AND-gate, and a positive voltage can be delivered from a terminal to a third input of the aforementioned AND-gate through a series connection of three normally-closed contacts of three delayed drop-out relays whose windings are connected to the direct-current terminals of full-wave rectifiers having alternating-current terminals applied through voltage transformers to phase conductors of the power line, the output of the AND-gate leading to a transistor whose collector circuit incorporates a relay whose normally open contact applies a feed voltage from a terminal to the terminal of a switch drive responsible for switching off the switch.

16. An arrangement for automatically isolating a faulty section of a power line of an electrical supply network wherein the power line of the electrical energy supply network is adapted to be connected to at least one energy source by means of a first switch and divided into invidivual sections by further switches, a switch-operating means associated with each of said switches, each of said switch-operating means being controllable at the particular switch by a monitoring means operatively associated with it and its associated switch, in dependence on the current in the power line, a transmitter controllable in dependence upon the response of the monitoring means associated with each one of at least a certain number of the switches, a receiver associated with each one of at least a certain number of the switches, the receiver being connected through a control connection to the switch-operating means associated with its associated switch, each transmitter having an output, the output of each transmitter associated with a certain switch being adapted for connection through a transmission channel containing a non-faulty part of the power line to an input of a receiver associated with another switch adjacent to that switch in the power line, the signal transmission in said transmission channel being directed opposite to the direction of energy flow in the power line throughout the duration of an excess current in order to control the switch associated with the receiver in dependence upon a signal transmitted in the even of an excess current, and wherein in the switch-operating means a first path leads from an input, at which signal indicating the excess current is delivered to it, through a timing element and a delay element to a first input, a second path leads through an inverter to a second input of an AND-gate, and a positive voltage can be delivered from a terminal to a third input of the aforementioned AND-gate through a normally closed contact of a delayed drop-out relay having a winding connected to direct-current terminals of a full-wave rectifier having alternating-current terminals applied through a voltage transformer to at least one of the phase conductors of the power line, the AND-gate having an output leading to a transistor whose collector circuit incorporates a relay having a normally-open contact which applies a feed voltage from a terminal to the terminal of a switch drive responsible for switching off the switch.

17. An arrangement for automatically isolating a faulty section of a power line of an electrical supply network wherein the power line of the electrical energy supply network is adapted to be connected to at least one energy source by means of a first switch and divided into individual sections by further switches, a switch-operating means associated with each of said switches, each of said switch-operating means being controllable at the particular switch by a monitoring means operatively associated with it and its associated switch, in dependence on the current in the power line, a transmitter controllable in dependence upon the response of the monitoring means associated with each one of at least a certain number of the switches, a receiver associated with each one of at least a certain number of the switches, the receiver being connected through a control connection to the switch-operating means associated with its associated switch, each transmitter having an output, the output of each transmitter associated with a certain switch being adapted for connection through a transmission channel containing a non-faulty part of the power line to an input of a receiver associated with another switch adjacent to that switch in the power line, the signal transmission in said transmission channel being directed opposite to the direction of energy flow in the power line throughout the duration of an excess current in order to control the switch associated with the receiver in dependence upon a signal transmitted in the event of an excess current, and wherein the power line has a branch, the two adjacent sections being designed to be connected through switches to a busbar, and said branch being designed to be connected through another switch to the busbar, and wherein a common transmitter is associated with several switches, the output of the transmitter being coupled through a line and a voltage transformer to the busbar, and a receiver associated with at least one of said switches and being connected through a voltage transformer to an adjacent section or to the line.

* * * * *